US012800555B2

(12) United States Patent
Lauber et al.

(10) Patent No.: US 12,800,555 B2
(45) Date of Patent: Nov. 17, 2026

(54) LIQUID CHROMATOGRAPHY BASED DETECTION AND QUANTITATION OF PHOSPHO PRODRUGS AND THEIR ACTIVE METABOLITES

(71) Applicant: Waters Technologies Corporation, Milford, MA (US)

(72) Inventors: Matthew A. Lauber, North Smithfield, RI (US); Kevin Wyndham, Upton, MA (US); Bonnie Alden, Whitinsville, MA (US); Dominic Foley, Wilmslow (GB); David Morrissey, Foulksmills (IE)

(73) Assignee: Waters Technologies Corporation, Milford, MA (US)

( * ) Notice: Subject to any disclaimer, the term of this patent is extended or adjusted under 35 U.S.C. 154(b) by 1187 days.

(21) Appl. No.: 17/308,637

(22) Filed: May 5, 2021

(65) Prior Publication Data

US 2021/0349061 A1 Nov. 11, 2021

Related U.S. Application Data

(60) Provisional application No. 63/020,317, filed on May 5, 2020.

(51) Int. Cl.
*G01N 30/56* (2006.01)
*G01N 30/02* (2006.01)
(Continued)

(52) U.S. Cl.
CPC ......... *G01N 30/56* (2013.01); *G01N 30/7233* (2013.01); *G01N 30/88* (2013.01);
(Continued)

(58) Field of Classification Search
CPC ...................................................... G01N 30/02
See application file for complete search history.

(56) References Cited

U.S. PATENT DOCUMENTS 2,801,186 A 7/1957 Alexander et al.
4,207,188 A 6/1980 Tsuda et al.
(Continued)

FOREIGN PATENT DOCUMENTS

AU 2020244497 A1 10/2020
CA 2538124 C 7/2010
(Continued)

OTHER PUBLICATIONS

Lim, C. K., and Peters, T., J. "Ammonium acetate: a general purpose buffer for clinical applications of high-performance liquid chromatography". 1984. Journal of Chromatography A. vol. 316. pp. 397-406. (Year: 1984).*
(Continued)

*Primary Examiner* — In Suk C Bullock
*Assistant Examiner* — Adam Adrien Germain
(74) *Attorney, Agent, or Firm* — WOMBLE BOND DICKINSON (US) LLP; Deborah M. Vernon; Ricardo Joseph

(57) ABSTRACT

The present disclosure relates to the use of vapor deposition coated flow paths for improved chromatography and sample analysis using liquid chromatography—mass spectrometry (LC/MS) or liquid chromatography-optical detection (LC/UV). More specifically, this technology relates to separating and quantitation of analytes (e.g., phospho prodrugs and its phosphorylated metabolites) from a sample matrix (e.g., mammalian blood, plasma) using chromatographic devices and fluidic systems having coated flow paths. The LC-MS or LC-UV techniques provide improved recovery, peak shape and dynamic range in the analysis of the prodrug and its metabolites.

9 Claims, 15 Drawing Sheets

(51) Int. Cl.
*G01N 30/72* (2006.01)
*G01N 30/88* (2006.01)

(52) U.S. Cl.
CPC . *G01N 2030/027* (2013.01); *G01N 2030/567* (2013.01); *G01N 2030/8827* (2013.01)

(56) References Cited

U.S. PATENT DOCUMENTS

| | | | |
|---|---|---|---|
| 4,708,782 | A | 11/1987 | Andresen et al. |
| 4,711,820 | A | 12/1987 | Arkles et al. |
| 4,833,093 | A | 5/1989 | Malmqvist et al. |
| 4,945,282 | A | 7/1990 | Kawamura et al. |
| 4,999,162 | A | 3/1991 | Wells et al. |
| 5,002,794 | A | 3/1991 | Ratner et al. |
| 5,153,072 | A | 10/1992 | Ratner et al. |
| 5,470,463 | A | 11/1995 | Girot et al. |
| 5,550,184 | A | 8/1996 | Halling |
| 5,595,813 | A | 1/1997 | Ogawa et al. |
| 5,643,436 | A | 7/1997 | Ogawa et al. |
| 5,658,732 | A | 8/1997 | Ebersole et al. |
| 5,688,855 | A | 11/1997 | Stoy et al. |
| 5,856,192 | A | 1/1999 | Bloch |
| 5,876,753 | A | 3/1999 | Timmons et al. |
| 5,877,028 | A | 3/1999 | Chandler et al. |
| 5,909,314 | A | 6/1999 | Oka et al. |
| 6,013,372 | A | 1/2000 | Hayakawa et al. |
| 6,054,227 | A | 4/2000 | Greenberg et al. |
| 6,074,981 | A | 6/2000 | Tada et al. |
| 6,121,608 | A | 9/2000 | Takada et al. |
| 6,194,346 | B1 | 2/2001 | Tada et al. |
| 6,207,263 | B1 | 3/2001 | Takematsu et al. |
| RE37,183 | E | 5/2001 | Kawamura et al. |
| 6,265,026 | B1 | 7/2001 | Wang |
| 6,277,489 | B1 | 8/2001 | Abbott et al. |
| 6,306,506 | B1 | 10/2001 | Timmons et al. |
| 6,329,024 | B1 | 12/2001 | Timmons et al. |
| 6,329,209 | B1 | 12/2001 | Wagner et al. |
| 6,337,129 | B1 | 1/2002 | Watanabe et al. |
| 6,340,404 | B1 | 1/2002 | Oka et al. |
| 6,383,642 | B1 | 5/2002 | Le Bellac et al. |
| 6,436,682 | B1 | 8/2002 | Bryan et al. |
| 6,440,565 | B1 | 8/2002 | Kim et al. |
| 6,444,326 | B1 | 9/2002 | Smith |
| 6,461,334 | B1 | 10/2002 | Buch-Rasmussen et al. |
| 6,465,056 | B1 | 10/2002 | Chabrecek et al. |
| 6,482,531 | B1 | 11/2002 | Timmons et al. |
| 6,547,868 | B1 | 4/2003 | Belmares et al. |
| 6,599,594 | B1 | 7/2003 | Walther et al. |
| 6,645,378 | B1 | 11/2003 | Liu et al. |
| 6,660,338 | B1 | 12/2003 | Hargreaves |
| 6,686,035 | B2 | 2/2004 | Jiang et al. |
| 6,706,408 | B2 | 3/2004 | Jelle |
| 6,743,516 | B2 | 6/2004 | Murphy et al. |
| 6,763,437 | B1 | 7/2004 | Nguyen et al. |
| 6,783,800 | B2 | 8/2004 | Saito et al. |
| 6,844,028 | B2 | 1/2005 | Mao et al. |
| 6,873,387 | B2 | 3/2005 | Hokazono et al. |
| 6,905,772 | B2 | 6/2005 | Shoup et al. |
| 6,916,541 | B2 | 7/2005 | Pantano et al. |
| 6,991,826 | B2 | 1/2006 | Pellerite et al. |
| 7,067,194 | B2 | 6/2006 | Mao et al. |
| 7,138,186 | B2 | 11/2006 | Luten, III |
| 7,250,214 | B2 | 7/2007 | Walter et al. |
| 7,285,674 | B2 | 10/2007 | Palma et al. |
| 7,294,365 | B2 | 11/2007 | Hayakawa et al. |
| 7,351,477 | B2 | 4/2008 | Yamaya et al. |
| 7,387,836 | B2 | 6/2008 | Gianolio et al. |
| 7,413,774 | B2 | 8/2008 | Kobrin et al. |
| 7,419,636 | B2 | 9/2008 | Aker et al. |
| 7,419,699 | B2 | 9/2008 | Kitada et al. |
| 7,431,969 | B2 | 10/2008 | Gleason et al. |
| 7,553,514 | B2 | 6/2009 | Fan et al. |
| 7,629,029 | B2 | 12/2009 | Mao et al. |
| 7,638,167 | B2 | 12/2009 | Kobrin et al. |
| 7,662,936 | B2 | 2/2010 | Kadkhodayan et al. |
| 7,687,239 | B2 | 3/2010 | Goldberg et al. |
| 7,695,775 | B2 | 4/2010 | Kobrin et al. |
| 7,732,216 | B2 | 6/2010 | Nochumson et al. |
| 7,736,735 | B2 | 6/2010 | Kanamori et al. |
| 7,776,396 | B2 | 8/2010 | Kobrin et al. |
| 7,785,649 | B2 | 8/2010 | Jung et al. |
| 7,815,922 | B2 | 10/2010 | Chaney et al. |
| 7,842,393 | B2 | 11/2010 | Kuzuya et al. |
| 7,879,396 | B2 | 2/2011 | Kobrin et al. |
| 7,901,744 | B2 | 3/2011 | Denes et al. |
| 7,935,489 | B2 | 5/2011 | O'Neill et al. |
| 7,935,659 | B2 | 5/2011 | Nova et al. |
| 7,955,656 | B2 | 6/2011 | Murayama et al. |
| 7,955,704 | B2 | 6/2011 | Lowery et al. |
| 8,008,225 | B2 | 8/2011 | Henze et al. |
| 8,025,915 | B2 | 9/2011 | Haines et al. |
| 8,062,881 | B2 | 11/2011 | Bookbinder et al. |
| 8,105,821 | B2 | 1/2012 | McGall et al. |
| 8,147,954 | B2 | 4/2012 | Lee et al. |
| 8,163,354 | B2 | 4/2012 | Dang et al. |
| 8,178,168 | B2 | 5/2012 | O'Neill et al. |
| 8,178,602 | B2 | 5/2012 | Mao et al. |
| 8,323,166 | B2 | 12/2012 | Haines et al. |
| 8,349,408 | B2 | 1/2013 | Dulka et al. |
| 8,366,814 | B2 | 2/2013 | Jones et al. |
| 8,404,621 | B2 | 3/2013 | Ikeda et al. |
| 8,512,864 | B2 | 8/2013 | Konno et al. |
| 8,557,748 | B2 | 10/2013 | Ikeda et al. |
| 8,580,355 | B2 | 11/2013 | Durandeau et al. |
| 8,652,588 | B2 | 2/2014 | Teer et al. |
| 8,668,972 | B2 | 3/2014 | Lewis et al. |
| 8,691,104 | B2 | 4/2014 | Greer et al. |
| 8,709,588 | B2 | 4/2014 | Cadet et al. |
| 8,741,158 | B2 | 6/2014 | Aytug et al. |
| 8,778,278 | B2 | 7/2014 | Xiong et al. |
| 8,784,565 | B2 | 7/2014 | Hillabrand et al. |
| 8,795,787 | B2 | 8/2014 | Jehle |
| 8,841,070 | B2 | 9/2014 | Harnack et al. |
| 8,992,590 | B2 | 3/2015 | Ott et al. |
| 8,993,479 | B2 | 3/2015 | Zuilhof et al. |
| 8,999,156 | B2 | 4/2015 | Iraneta et al. |
| 9,034,660 | B2 | 5/2015 | Boday et al. |
| 9,075,189 | B2 | 7/2015 | West |
| 9,108,012 | B2 | 8/2015 | Pryce Lewis et al. |
| 9,175,026 | B2 | 11/2015 | Garrell et al. |
| 9,255,929 | B2 | 2/2016 | Jiang et al. |
| 9,272,095 | B2 | 3/2016 | Felts et al. |
| 9,308,520 | B2 | 4/2016 | Ekeroth |
| 9,340,880 | B2 | 5/2016 | Mattzela |
| 9,364,853 | B2 | 6/2016 | Chen |
| 9,388,315 | B2 | 7/2016 | Hoshino |
| 9,445,504 | B2 | 9/2016 | Kang et al. |
| 9,475,225 | B2 | 10/2016 | Giraud et al. |
| 9,523,004 | B2 | 12/2016 | Hervieu et al. |
| 9,533,006 | B2 | 1/2017 | Jiang et al. |
| 9,541,480 | B2 | 1/2017 | Chang et al. |
| 9,556,360 | B2 | 1/2017 | McGall et al. |
| 9,777,368 | B2 | 10/2017 | Smith et al. |
| 9,915,001 | B2 | 3/2018 | Yuan et al. |
| 9,925,521 | B2 | 3/2018 | Wyndham et al. |
| 9,926,203 | B2 | 3/2018 | Zhou |
| 9,975,143 | B2 | 5/2018 | Smith et al. |
| 9,999,901 | B2 | 6/2018 | Boscher et al. |
| 10,472,769 | B2 | 11/2019 | Tuteja et al. |
| 10,604,660 | B2 | 3/2020 | Smith et al. |
| 10,813,609 | B2 | 10/2020 | Goto et al. |
| 10,813,610 | B2 | 10/2020 | Yoshida et al. |
| 10,814,253 | B2 | 10/2020 | Lipkens et al. |
| 10,814,305 | B2 | 10/2020 | Liao et al. |
| 10,814,319 | B2 | 10/2020 | Dasgupta et al. |
| 10,814,320 | B2 | 10/2020 | Le et al. |
| 10,814,740 | B2 | 10/2020 | Wilhide |
| 10,815,247 | B2 | 10/2020 | Flemming et al. |
| 10,815,269 | B2 | 10/2020 | Maloisel et al. |
| 10,816,115 | B2 | 10/2020 | Buerger et al. |
| 10,816,476 | B2 | 10/2020 | Nunney et al. |
| 10,816,487 | B2 | 10/2020 | Matney et al. |
| 10,816,515 | B2 | 10/2020 | Hollnagel et al. |
| 10,816,518 | B2 | 10/2020 | Jarrold et al. |

(56) References Cited

U.S. PATENT DOCUMENTS 10,816,786 B2 10/2020 Douglas-Hamilton et al.
10,818,485 B2 10/2020 Yamaguchi
10,818,486 B2 10/2020 Corr et al.
10,828,665 B2 11/2020 Stiff-Roberts et al.
10,876,202 B2 12/2020 Verbeck, IV et al.
10,876,210 B1 12/2020 Claussen et al.
10,895,009 B2 1/2021 Carr et al.
10,912,714 B2 2/2021 Weikart et al.
11,435,327 B2 9/2022 Matsumoto
11,442,064 B2 9/2022 Koskinen et al.
11,511,213 B2 11/2022 Belanger et al.
2001/0021446 A1 9/2001 Takematsu et al.
2002/0003109 A1 1/2002 Gjerde et al.
2002/0016250 A1 2/2002 Hayakawa et al.
2002/0020053 A1 2/2002 Fonash et al.
2002/0026899 A1 3/2002 McLaughlin et al.
2002/0142621 A1 10/2002 Wang
2002/0172938 A1 11/2002 Cuomo et al.
2002/0195950 A1 12/2002 Mikhael et al.
2003/0049860 A1 3/2003 Cholewa
2003/0057154 A1 3/2003 Gjerde et al.
2003/0059573 A1 3/2003 Timmons et al.
2003/0109062 A1 6/2003 Inomata et al.
2003/0113477 A1 6/2003 Timmons et al.
2003/0138645 A1 7/2003 Gleason et al.
2004/0261703 A1 12/2004 Kobrin et al.
2005/0118595 A1 6/2005 Lahann
2005/0164402 A1 7/2005 Belisle et al.
2005/0214803 A1 9/2005 Wang
2006/0073521 A1 4/2006 Saito et al.
2006/0110594 A1 5/2006 Frutos et al.
2006/0213441 A1 9/2006 Kobrin et al.
2006/0219598 A1 10/2006 Cody et al.
2006/0251795 A1 11/2006 Kobrin et al.
2007/0031854 A1 2/2007 Katsilometes
2007/0048747 A1 3/2007 Leslie et al.
2007/0065591 A1 3/2007 Parbhu
2007/0122308 A1 5/2007 Ikeda et al.
2007/0172666 A1 7/2007 Denes et al.
2007/0254378 A1 11/2007 Zhang et al.
2008/0041105 A1 2/2008 Hahn et al.
2008/0075960 A1 3/2008 Pocius et al.
2008/0085528 A1 4/2008 Marcinkeviciene et al.
2008/0128606 A1 6/2008 Grant et al.
2008/0170230 A1 7/2008 Gerion
2008/0188010 A1 8/2008 Saitoh et al.
2008/0248589 A1 10/2008 Belisle et al.
2008/0312356 A1 12/2008 Kobrin et al.
2009/0020712 A1 1/2009 Matsumoto
2009/0078633 A1 3/2009 Chen et al.
2009/0081371 A1 3/2009 Minami et al.
2009/0137526 A1 5/2009 Jubert et al.
2009/0162571 A1 6/2009 Haines et al.
2009/0176084 A1 7/2009 Yoshihara et al.
2009/0206034 A1* 8/2009 Nakajima ............ B01J 20/3276
528/34
2009/0286435 A1 11/2009 Badyal et al.
2009/0318609 A1 12/2009 Badyal et al.
2010/0038298 A1 2/2010 Angelini et al.
2010/0051464 A1 3/2010 Nakayama et al.
2010/0080903 A1 4/2010 Tamitsuji et al.
2010/0178512 A1 7/2010 Giesenberg et al.
2010/0196724 A1 8/2010 Yamasaki et al.
2010/0200207 A1 8/2010 Fukuda et al.
2010/0203646 A1 8/2010 Larsen et al.
2010/0282077 A1 11/2010 Jones et al.
2010/0285596 A1 11/2010 Yu et al.
2010/0330278 A1 12/2010 Choi et al.
2011/0000658 A1 1/2011 Tanaka et al.
2011/0062047 A1 3/2011 Haines et al.
2011/0120213 A1 5/2011 Hirayama et al.
2011/0120940 A1 5/2011 Allen et al.
2011/0189493 A1 8/2011 Ott et al.
2011/0295033 A1 12/2011 Mayorga et al.
2012/0069295 A1 3/2012 Fukagawa et al.
2012/0100546 A1 4/2012 Lowery, Jr. et al.
2012/0123345 A1 5/2012 Felts et al.
2012/0132794 A1 5/2012 Buchanan et al.
2012/0178848 A1 7/2012 Adkinson et al.
2012/0181232 A1* 7/2012 Chen ...................... G01N 1/405
210/686
2012/0219697 A1 8/2012 Chen
2012/0219727 A1 8/2012 Gandhiraman et al.
2012/0251797 A1 10/2012 Smith et al.
2012/0252709 A1 10/2012 Felts et al.
2012/0288717 A1 11/2012 Mao et al.
2012/0298585 A1 11/2012 Ritchie et al.
2013/0004780 A1 1/2013 Hervieu et al.
2013/0025503 A1 1/2013 Park et al.
2013/0029138 A1 1/2013 Benard et al.
2013/0090260 A1 4/2013 Nova et al.
2013/0136937 A1 5/2013 Fujii et al.
2013/0157062 A1 6/2013 Kihara et al.
2013/0174642 A1 7/2013 Bourlon et al.
2013/0244025 A1 9/2013 Smith et al.
2013/0266762 A1 10/2013 Mayers et al.
2013/0337226 A1 12/2013 Curran et al.
2014/0004022 A1 1/2014 Sagona et al.
2014/0065368 A1 3/2014 Aytug et al.
2014/0147631 A1 5/2014 Yang et al.
2014/0154399 A1 6/2014 Weikart et al.
2014/0187666 A1 7/2014 Aizenberg et al.
2014/0202355 A1 7/2014 Hoshino
2014/0287240 A1 9/2014 Murotani et al.
2014/0299538 A1 10/2014 Gleason et al.
2014/0318748 A1 10/2014 Svensson et al.
2014/0323981 A1 10/2014 Giraud et al.
2014/0342954 A1 11/2014 Ingber et al.
2014/0357091 A1 12/2014 Mattzela
2014/0370300 A1 12/2014 Smith
2015/0021339 A1 1/2015 Felts et al.
2015/0024152 A1 1/2015 Carr et al.
2015/0030885 A1 1/2015 Smith
2015/0064376 A1 3/2015 Smith et al.
2015/0064451 A1 3/2015 Kalaga et al.
2015/0098084 A1 4/2015 Felts et al.
2015/0118502 A1 4/2015 Mitsuhashi et al.
2015/0118504 A1 4/2015 Ohshita et al.
2015/0122365 A1 5/2015 Carr et al.
2015/0152124 A1 6/2015 Mori et al.
2015/0175814 A1 6/2015 Aizenberg et al.
2015/0209846 A1 7/2015 Aizanberg et al.
2015/0210951 A1 7/2015 Aizenberg et al.
2015/0232806 A1 8/2015 Jung et al.
2015/0239773 A1 8/2015 Aytug
2015/0247051 A1 9/2015 Ha et al.
2015/0273522 A1 10/2015 Boscher et al.
2015/0283307 A1 10/2015 Smith et al.
2015/0298165 A1 10/2015 Smith
2015/0307525 A1 10/2015 Higano et al.
2015/0307719 A1 10/2015 Mitsuhashi et al.
2015/0309216 A1 10/2015 Fournand
2015/0322272 A1 11/2015 Pokroy et al.
2015/0329725 A1 11/2015 Liu
2016/0002488 A1 1/2016 Takao et al.
2016/0002489 A1 1/2016 Gleason et al.
2016/0017397 A1 1/2016 Roy et al.
2016/0038972 A1 2/2016 Lu
2016/0040039 A1 2/2016 Yamane et al.
2016/0059260 A1 3/2016 Smith et al.
2016/0074862 A1 3/2016 Breaux et al.
2016/0082435 A1 3/2016 Bunner et al.
2016/0168021 A1 6/2016 Goh et al.
2016/0200941 A1 7/2016 Liu et al.
2016/0225616 A1 8/2016 Li et al.
2016/0231594 A1 8/2016 Ang et al.
2016/0243308 A1 8/2016 Giraud et al.
2016/0251261 A1 9/2016 Bureau
2016/0289824 A1 10/2016 Mattzela et al.
2016/0302723 A1 10/2016 Chen
2016/0340544 A1 11/2016 Katsukawa et al.
2017/0001956 A1 1/2017 Chau et al.
2017/0044315 A1 2/2017 Mitsuhashi et al.
2017/0173223 A1 6/2017 Delaney, Jr. et al.

(56) References Cited

U.S. PATENT DOCUMENTS

| | | | |
|---|---|---|---|
| 2017/0198003 | A1 | 7/2017 | Xiao et al. |
| 2018/0049644 | A1 | 2/2018 | Themelis |
| 2018/0357402 | A1 | 12/2018 | Omata et al. |
| 2019/0032201 | A1 | 1/2019 | Smith et al. |
| 2019/0077966 | A1 | 3/2019 | Koguchi et al. |
| 2019/0086371 | A1* | 3/2019 | Lauber .................. B01J 20/291 |
| 2019/0170705 | A1 | 6/2019 | Wyndham et al. |
| 2019/0271711 | A1 | 9/2019 | Egan et al. |
| 2019/0292220 | A1 | 9/2019 | Birdsall |
| 2019/0345551 | A1* | 11/2019 | Tomizawa ............ G01N 33/50 |
| 2019/0390329 | A1 | 12/2019 | Carr et al. |
| 2020/0024155 | A1 | 1/2020 | Kano et al. |
| 2020/0024156 | A1 | 1/2020 | Kano et al. |
| 2020/0024157 | A1 | 1/2020 | Kano et al. |
| 2020/0025729 | A1 | 1/2020 | Milburn et al. |
| 2020/0033304 | A1 | 1/2020 | Rainville et al. |
| 2020/0062615 | A1 | 2/2020 | Rajagopalan et al. |
| 2020/0109297 | A1 | 4/2020 | McDaniel |
| 2020/0189938 | A1 | 6/2020 | Kano et al. |
| 2020/0215457 | A1 | 7/2020 | DeLano et al. |
| 2020/0239641 | A1 | 7/2020 | Kawakami et al. |
| 2020/0269157 | A1 | 8/2020 | DeLano et al. |
| 2020/0328073 | A1 | 10/2020 | Peterson et al. |
| 2020/0332801 | A1 | 10/2020 | Kimura |
| 2020/0333265 | A1 | 10/2020 | Doki et al. |
| 2020/0333369 | A1 | 10/2020 | Toyoda et al. |
| 2020/0334792 | A1 | 10/2020 | Themelis |
| 2020/0335902 | A1 | 10/2020 | Tanaka |
| 2020/0337659 | A1 | 10/2020 | Sano et al. |
| 2020/0338528 | A1 | 10/2020 | Dong et al. |
| 2020/0339322 | A1 | 10/2020 | Christensen et al. |
| 2020/0339665 | A1 | 10/2020 | Bruhlmann et al. |
| 2020/0339931 | A1 | 10/2020 | Bremer et al. |
| 2020/0339977 | A1 | 10/2020 | Lebofsky et al. |
| 2020/0339980 | A1 | 10/2020 | Dellinger et al. |
| 2020/0340047 | A1 | 10/2020 | Mollerup |
| 2020/0340468 | A1 | 10/2020 | Kuntz et al. |
| 2020/0340889 | A1 | 10/2020 | Mlcak et al. |
| 2020/0340890 | A1 | 10/2020 | Mlcak |
| 2020/0340910 | A1 | 10/2020 | Handique |
| 2020/0340946 | A1 | 10/2020 | Bateman et al. |
| 2020/0340949 | A1 | 10/2020 | Mlcak et al. |
| 2020/0340950 | A1 | 10/2020 | Mlcak et al. |
| 2020/0340956 | A1 | 10/2020 | Ortmann et al. |
| 2020/0340959 | A1 | 10/2020 | Schultz et al. |
| 2020/0340961 | A1 | 10/2020 | Kunimura |
| 2020/0340982 | A1 | 10/2020 | Levin et al. |
| 2020/0341253 | A1 | 10/2020 | Foelling |
| 2020/0341255 | A1 | 10/2020 | Chan |
| 2020/0341259 | A1 | 10/2020 | Chan et al. |
| 2020/0341278 | A1 | 10/2020 | Tanaka |
| 2020/0341378 | A1 | 10/2020 | Wolterink et al. |
| 2020/0342326 | A1 | 10/2020 | Rahnama Moghaddam |
| 2020/0342672 | A1 | 10/2020 | Schmelig et al. |
| 2020/0343082 | A1 | 10/2020 | Richardson et al. |
| 2020/0348307 | A1 | 11/2020 | Beierle et al. |
| 2020/0365237 | A1 | 11/2020 | Madden et al. |
| 2020/0375846 | A1 | 12/2020 | Chang et al. |
| 2021/0009817 | A1 | 1/2021 | Poulet et al. |
| 2021/0009883 | A1 | 1/2021 | Tuteja et al. |
| 2021/0032157 | A1 | 2/2021 | Czihal et al. |
| 2021/0061049 | A1 | 3/2021 | Lekon et al. |
| 2021/0098233 | A1 | 4/2021 | Kapoor et al. |
| 2021/0101176 | A1 | 4/2021 | Baltazar et al. |
| 2021/0108252 | A1 | 4/2021 | Beverly |
| 2021/0220755 | A1 | 7/2021 | Donegan et al. |
| 2021/0255196 | A1 | 8/2021 | Birdsall et al. |

FOREIGN PATENT DOCUMENTS

| | | | |
|---|---|---|---|
| CA | 2881275 | C | 10/2020 |
| CA | 2855353 | C | 1/2021 |
| CN | 111944153 | A | 11/2020 |
| CN | 112011055 | A | 12/2020 |
| CN | 112264272 | A | 1/2021 |
| EP | 2144057 | A1 | 1/2010 |
| EP | 2587258 | A1 | 5/2013 |
| EP | 2826884 | A1 | 1/2015 |
| EP | 2608219 | B1 | 3/2015 |
| EP | 2915833 | A1 | 9/2015 |
| EP | 3573646 | A1 | 12/2019 |
| EP | 3633366 | A1 | 4/2020 |
| EP | 2403621 | B1 | 10/2020 |
| EP | 2798664 | B1 | 10/2020 |
| EP | 2834837 | B1 | 10/2020 |
| EP | 2900819 | B1 | 10/2020 |
| EP | 3006980 | B1 | 10/2020 |
| EP | 3060325 | B1 | 10/2020 |
| EP | 3131657 | B1 | 10/2020 |
| EP | 3139150 | B1 | 10/2020 |
| EP | 3169232 | B1 | 10/2020 |
| EP | 3169424 | B1 | 10/2020 |
| EP | 3273674 | B1 | 10/2020 |
| EP | 3344317 | B1 | 10/2020 |
| EP | 3399074 | B1 | 10/2020 |
| EP | 3545085 | A4 | 10/2020 |
| EP | 3727152 | A1 | 10/2020 |
| EP | 3727637 | A1 | 10/2020 |
| EP | 3727679 | A1 | 10/2020 |
| EP | 3727690 | A1 | 10/2020 |
| EP | 3728046 | A1 | 10/2020 |
| EP | 3728581 | A1 | 10/2020 |
| EP | 3728621 | A2 | 10/2020 |
| EP | 3728633 | A1 | 10/2020 |
| EP | 3729055 | A1 | 10/2020 |
| EP | 3729071 | A1 | 10/2020 |
| EP | 3729077 | A1 | 10/2020 |
| EP | 3729083 | A1 | 10/2020 |
| EP | 3729162 | A1 | 10/2020 |
| EP | 3729487 | A1 | 10/2020 |
| EP | 3729488 | A2 | 10/2020 |
| EP | 3730119 | A1 | 10/2020 |
| EP | 3730324 | A1 | 10/2020 |
| EP | 3730406 | A1 | 10/2020 |
| EP | 3730538 | A1 | 10/2020 |
| EP | 3730599 | A1 | 10/2020 |
| EP | 3730922 | A1 | 10/2020 |
| EP | 3730923 | A1 | 10/2020 |
| EP | 3730927 | A1 | 10/2020 |
| EP | 3731393 | A1 | 10/2020 |
| EP | 3749719 | A1 | 12/2020 |
| EP | 3788181 | A1 | 3/2021 |
| FR | 3095337 | A1 | 10/2020 |
| GB | 2108403 | A | 5/1983 |
| GB | 2429428 | A | 2/2007 |
| GB | 2481687 | A | 1/2012 |
| GB | 2486679 | A | 6/2012 |
| GB | 2490243 | A | 10/2012 |
| GB | 2501803 | A | 11/2013 |
| GB | 2531126 | A | 4/2016 |
| GB | 2549248 | A | 10/2017 |
| GB | 2534477 | B | 10/2020 |
| GB | 2574723 | B | 10/2020 |
| IL | 174122 | A | 9/2011 |
| IL | 239213 | A | 3/2020 |
| IL | 253518 | A | 6/2020 |
| IL | 262854 | A | 6/2020 |
| JP | 2012232870 | A | 11/2012 |
| JP | 2020507460 | A | 3/2020 |
| JP | 2020507462 | A | 3/2020 |
| JP | 2020507466 | A | 3/2020 |
| JP | 2020510522 | A | 4/2020 |
| JP | 6770727 | B2 | 10/2020 |
| JP | 6771390 | B2 | 10/2020 |
| JP | 6771801 | B2 | 10/2020 |
| JP | 6772721 | B2 | 10/2020 |
| JP | 6772764 | B2 | 10/2020 |
| JP | 6772953 | B2 | 10/2020 |
| JP | 6773138 | B2 | 10/2020 |
| JP | 6773236 | B2 | 10/2020 |
| JP | 2020169857 | A | 10/2020 |
| JP | 2020171429 | A | 10/2020 |
| JP | 2020171482 | A | 10/2020 |
| JP | 2020171483 | A | 10/2020 |

(56) References Cited

FOREIGN PATENT DOCUMENTS

| | | | |
|---|---|---|---|
| JP | 2020171484 | A | 10/2020 |
| JP | 2020171882 | A | 10/2020 |
| JP | 2020172518 | A | 10/2020 |
| JP | 2020172703 | A | 10/2020 |
| JP | 2020173192 | A | 10/2020 |
| JP | 2020173427 | A | 10/2020 |
| JP | 2020176195 | A | 10/2020 |
| JP | 2020177669 | A | 10/2020 |
| JP | 2020530329 | A | 10/2020 |
| JP | 2020530909 | A | 10/2020 |
| JP | 2020536764 | A | 12/2020 |
| KR | 20000019936 | A | 4/2000 |
| KR | 20060130959 | A | 12/2006 |
| KR | 20080071942 | A | 8/2008 |
| KR | 20090103323 | A | 10/2009 |
| KR | 20120007817 | A | 1/2012 |
| KR | 20130020869 | A | 3/2013 |
| KR | 20140082838 | A | 7/2014 |
| KR | 101711786 | B1 | 3/2017 |
| KR | 20170021957 | A | 3/2017 |
| KR | 101742683 | B1 | 6/2017 |
| KR | 20200139842 | A | 12/2020 |
| KR | 20210008523 | A | 1/2021 |
| KR | 102218186 | B1 | 2/2021 |
| KR | 20210013582 | A | 2/2021 |
| TW | 202031738 | A | 9/2020 |
| TW | 202039644 | A | 11/2020 |
| WO | 199119982 | A1 | 12/1991 |
| WO | 1998017407 | A1 | 4/1998 |
| WO | 1999040038 | A1 | 8/1999 |
| WO | 199951773 | A1 | 10/1999 |
| WO | 200032044 | A1 | 6/2000 |
| WO | 200168240 | A2 | 9/2001 |
| WO | 2002085250 | A2 | 10/2002 |
| WO | 2002085330 | A1 | 10/2002 |
| WO | 2003104394 | A2 | 12/2003 |
| WO | 2005052544 | A2 | 6/2005 |
| WO | 2006015982 | A2 | 2/2006 |
| WO | 2006121295 | A1 | 11/2006 |
| WO | 2007081387 | A1 | 7/2007 |
| WO | 2007117191 | A1 | 10/2007 |
| WO | 2007117213 | A1 | 10/2007 |
| WO | 2007117214 | A1 | 10/2007 |
| WO | 2007126913 | A1 | 11/2007 |
| WO | 2009007150 | A2 | 1/2009 |
| WO | 2010009311 | A1 | 1/2010 |
| WO | 2010135660 | A2 | 11/2010 |
| WO | 2012170549 | A1 | 12/2012 |
| WO | 2013064754 | A1 | 5/2013 |
| WO | 2014104495 | A1 | 7/2014 |
| WO | 2014104573 | A1 | 7/2014 |
| WO | 2014164928 | A1 | 10/2014 |
| WO | 2015050449 | A2 | 4/2015 |
| WO | 2015054652 | A2 | 4/2015 |
| WO | 2015134488 | A1 | 9/2015 |
| WO | 2016100923 | A1 | 6/2016 |
| WO | 2016114850 | A1 | 7/2016 |
| WO | 2016125272 | A1 | 8/2016 |
| WO | 2016160702 | A1 | 10/2016 |
| WO | 2016166816 | A1 | 10/2016 |
| WO | 2016176561 | A1 | 11/2016 |
| WO | 2016191738 | A1 | 12/2016 |
| WO | 2017040623 | A1 | 3/2017 |
| WO | 2017053891 | A1 | 3/2017 |
| WO | 2017060991 | A1 | 4/2017 |
| WO | 2017072893 | A1 | 5/2017 |
| WO | 2017087032 | A1 | 5/2017 |
| WO | 2017098758 | A1 | 6/2017 |
| WO | 2017143246 | A1 | 8/2017 |
| WO | 2017171546 | A1 | 10/2017 |
| WO | 2017189357 | A2 | 11/2017 |
| WO | 2017210223 | A1 | 12/2017 |
| WO | 2018072862 | A1 | 4/2018 |
| WO | 2018146318 | A1 | 8/2018 |
| WO | 2018202935 | A1 | 11/2018 |
| WO | 2019053693 | A1 | 3/2019 |
| WO | 2019063482 | A1 | 4/2019 |
| WO | 2019101980 | A1 | 5/2019 |
| WO | 2019116619 | A1 | 6/2019 |
| WO | 2019122100 | A1 | 6/2019 |
| WO | 2019126130 | A1 | 6/2019 |
| WO | 2019130536 | A1 | 7/2019 |
| WO | 2019138705 | A1 | 7/2019 |
| WO | 2019150573 | A1 | 8/2019 |
| WO | 2019152724 | A1 | 8/2019 |
| WO | 2019154758 | A1 | 8/2019 |
| WO | 2019155543 | A1 | 8/2019 |
| WO | 2019155545 | A1 | 8/2019 |
| WO | 2019165297 | A1 | 8/2019 |
| WO | 2019168989 | A1 | 9/2019 |
| WO | 2019171085 | A1 | 9/2019 |
| WO | 2019175441 | A1 | 9/2019 |
| WO | 2019176081 | A1 | 9/2019 |
| WO | 2019180045 | A1 | 9/2019 |
| WO | 2019185607 | A1 | 10/2019 |
| WO | 2019186999 | A1 | 10/2019 |
| WO | 2019191269 | A1 | 10/2019 |
| WO | 2019191587 | A2 | 10/2019 |
| WO | 2019193558 | A1 | 10/2019 |
| WO | 2019198280 | A1 | 10/2019 |
| WO | 2019200306 | A1 | 10/2019 |
| WO | 2019212799 | A1 | 11/2019 |
| WO | 2019218088 | A1 | 11/2019 |
| WO | 2019224201 | A1 | 11/2019 |
| WO | 2019224540 | A1 | 11/2019 |
| WO | 2019229171 | A1 | 12/2019 |
| WO | 2019238469 | A1 | 12/2019 |
| WO | 2019241394 | A1 | 12/2019 |
| WO | 2020068174 | A2 | 4/2020 |
| WO | 2020095566 | A1 | 5/2020 |
| WO | 2020104521 | A2 | 5/2020 |
| WO | 2020213061 | A1 | 10/2020 |
| WO | 2020213101 | A1 | 10/2020 |
| WO | 2020213209 | A1 | 10/2020 |
| WO | 2020216966 | A1 | 10/2020 |
| WO | 2020219451 | A1 | 10/2020 |
| WO | 2020219605 | A1 | 10/2020 |
| WO | 2020219659 | A1 | 10/2020 |
| WO | 2020219667 | A1 | 10/2020 |
| WO | 2020219671 | A1 | 10/2020 |
| WO | 2020219784 | A1 | 10/2020 |
| WO | 2020219869 | A1 | 10/2020 |
| WO | 2021019220 | A1 | 2/2021 |
| WO | 2021061049 | A1 | 4/2021 |
| WO | 2021072245 | A1 | 4/2021 |

OTHER PUBLICATIONS

Avataneo, V., et al. "Development and validation of a UHPLC-MS/MS method for quantification of the prodrug remdesivir and its metabolite GS-441524 . . . ". May 3, 2020. Journal of Antimicrobial Chemotherapy. 75. 1772-1777 (Year: 2020).*

Lesellier, Eric et al, Mixed-Mode Chromatography—A Review, LCGC Supplements, vol. 30, Issue 6, Jun. 1, 2017, https://www.chromatographyonline.com/view/mixed-mode-chromatography-review (Year: 2017).*

Williamson, B. N., et al. "Clinical benefit of remdesivir in rhesus macaques infected with SARS-CoV-2". Apr. 22, 2020. bioRxiv. doi: https://doi.org/10.1101/2020.04.15.043166 (Year: 2020).*

"Carboxy-silane triol." PubChem, Aug. 12, 2023.

"Corrosion Resistant Coating Properties: Extend Product Life, Prevent Contamination." SilcoTek. 2023.

"Electrical Property Characterization of SilcoTek Coatings." Retrieved on Jul. 31, 2023.

"High Purity Coatings, the Secret Weapon in Semiconductor Manufacturing." SilcoTek, Dec. 12, 2014.

"How Corrosion Resistant is Dursan? Let's Find Out." SilcoTek. Jan. 23, 2025.

"How to Identify and Prevent Fouling (HPL)". SilcoTek. Jun. 22, 2017.

Reliable Sampling & Transfer of Sulfur Passivation vs. Inert Coatings. SilcoTek. Jun. 16, 2011.

(56) References Cited

OTHER PUBLICATIONS

"Silane Coupling Agents: Connecting Across Boundaries." Gelest, Inc. 2014.
"Solving Surface Fouling with New Non-Stick CVD Coatings." SilcoTek. Aug. 31, 2017.
"Specialty Coatings." https://geniefilters.com/news-room/specialty-coatings. Dec. 29, 2013.
"Visit Us at Pittcon: Make Your HPLC System Faster & More Reliable." SilcoTek. Mar. 3, 2017.
"What's SilcoTek Talking About at Pittcon 2018." SilcoTek. Feb. 16, 2018.
Al-Hamarneh et al. "Synthesis and characterization of di(ethylene glycol) vinyl ether films deposited by atmospheric pressure corona discharge plasma." Surface Coatings Technol. 234(2013):33-41.
Barone et al. "Characterizing the Performance of Surface Modifications that Enhance Sensitivty, Reliability, Reproducibility and Accuracy of Analytical Instruments." (2011).
Barone et al. "Improving Reliability of Analytical and Sampling Systems in Challenges and Corrosive Environments." (2011).
Barone. "Corrosion Control and Chemically inert nano-coatings for use in refining, petrochemical and analytical equipment industries." 2021.
Barone. "Exciting Developments in Silicon Barrier Coatings for Semicon." SllcokTek. Jul. 15, 2015.
Beigbeder et al. "Marine Fouling Release Silicone/Carbon Nanotube Nanocomposite Coatings: On the Importance of the Nanotube Dispersion State." J. Nanosci. Nanotech, 10(2010): 2972-2978.
BIOCYL™ X1, Dec. 20, 2018.
Bischof. "Achieving PEEK-like Performance on Stainless Steel HPLC Components with Bio-Inert CVD Coatings." SilcoTek. Feb. 28, 2019.
Brown et al. "Sampling of gaseous sulfur-containing compounds at low concentrations with a review of best-practice methods for biogas and natural gas applications." Trends Anal. Chem. 64(2015): 42-52.
Buchmeiser. "New synthetic ways for the preparation of high-performance liquid chromatography supports." J. Chromatogr. A. 918(2001): 233-266.
Carretier et al. "Design of PVDF/PEGMA-b-PS-b-PEGMA membranes by VIPS for improved biofouling mitigation." J. Membrane Sci. 510(2016):355-369.
Cheong. "Fritting techniques in chromatography." J. Sep. Sci. 37(2014): 603-617.
Colic et al. "Synergistic Application of Chemical and Electromagnetic Water Treatment in Corrosion and Scale Prevention." Croatiia Chem. Acta. 71.4(1998): 905-916.
Conroy. "Nanostructed surfaces for sening heavy metals and radionuclides in aqueous systems." Doctorate thesis—Philosophy—The University of Leeds. Oct. 2012.
Dursan: An Inert and Corrosion Resistant High Performance CVD Coating. SilcoTek. Retrieved on Jul. 31, 2023.
Dursan® and SilcoNert® 2000 Coating Comparison Guide. (2000).
Dursan® Coating Data Sheet. 2022.
Dursan® Coating Data Sheet. Jun. 1, 2021.
Dursan® Coating for Improved, Metal-Free Liquid Chromatography. Dec. 20, 2018.
Dursan® Data Sheet 2018.
Gosetti et al. "Signal suppression/enhancement in high-performance liquid chromatography tandem mass spectrometry." J. Chromatogr. A. 1217(2010): 3929-3937.
Hayes et al. "Core-shell particles: Preparation fundamentals and applications in high performance liquid chromatography." J. Chromatogr. A. 1357(2014): 36-52.
HPLC Hardware. Möller Medical. (2007).
Hsieh et al. "Effective Enhancement of Fluorescence Detection Efficiency in Protein Microarray Assays: Application of a Highly Fluorinated Organosilane as the Blocking Agent on the Background Surface by a Facile Vapor-Phase Deposition Process." Anal. Chem. 81(2009): 7908-7916.
International Search Report and Written Opinion issued in International Application No. PCT/IB2021/059534 dated Mar. 10, 2022.
Kaliaraj et al. "Bio-inspired YSZ coated titanium by EB-PVD for biomedical applications." Surface and Coatings Technol. 307(2016): 227-235.
Kanavarioti et al. "HPLC methods for purity evaluation of man-made single-stranded RNAs." Nature. 9(2019): 1019.
Kong. "Measuring the Electrostatic Repulsion Forces Beween Glycosaminoglycans Using the Atomic Force Microscope." Masters Thesis—Department of Materials Science Engineering at Massachusetts Institute of Technology, Sep. 1999.
Lauber et al. "Rapid Preparation of Released N-Glycans for HILIC Analysis Using a Labeling Reagent that Facilitates Sensitive Fluorescence and ESI-MS Detection." Anal Chem. 87.10(2015): 5401-9.
Lecloux et al. "The safe use of carbon nanotubes in coating applications." OECD Conference on Benefits of nanomaterials. Paris, Jul. 15-17, 2009.
NanoCoatings Product Information. Möller Medical. (2010).
Ntrouka et al. "The effect of chemotherapeutic agents on contaminated titanium surfaces: a systematic review." Clin. Oral Impl. Res. 22(2011): 681-690.
Paleologos et al. "Micelle-mediated separation and cloud-point extraction." Trends Anal. Chem. 24.5(2005): 426-436.
Pfaunmiller et al. "Affinity monolith chromatography: A review of principles and recent analytical applications." Anal. Bionanal. Chem. 405.7(2013): 2133-2145.
Pirok et al. "Pratical Approaches to Overcome the Challenges of Comprehensive Two-Dimensional Liquid Chromatography." LCGC Europe. 31.5(2018): 242-249.
Pirok et al."Recent Developments in Two-Dimensional Liquid Chromatography: Fundamental Improvements for Practical Applications." Anal. Chem. 91.1(2019): 240-263.
Rahimi et al. "Application of copolymer coated frits for solid-phase extraction of poly cyclic aromatic hydrocarbons in water samples." Anal. Chim. Acta. 836(2014): 45-52.
Rivera et al. "Bioinert Versus Biocompatible: The Benefits of Different col. Materials in Liquid Chromatography Separations." LCGC Suppl. 36.6(2018).
Rosmaninho et al. "Modified stainless steel surfaces targeted to reduce fouling—Evaluation of fouling by milk components." J. Food Engineering. 80(2007): 1176-1187.
Shih et al. "Silanization of Stainless-Steel Frits for Use in Trace Metal Analysis by High Performance Liquid Chromatography." Talanta. 28(1981): 411-414.
SilcoTek Coating Properties: A Comprehensive Analysis of Coating Characteristics and Properties. e-book. Retrieved 2023.
SilcoTek Intellectual Property, Patents and Trademarks. Retrieved Jul. 31, 2023.
SilcoTek® Non-Stick CVD Coatings,. Retrieved Jul. 31, 2023.
Sun et al. "Vapor-based Grafting of Crosslinked Poly(N-vinyl pyrrolidone) Coatings with Tuned Hydrophilicity and Anti-Biofouling Properties." J. Mater. Chem. B. 4(2016): 2669-2678.
Technical Program, Agenda of Sessions: Abstract PDF. Pittcon, Atlanta, GA, Mar. 6-10, 2016.
Vaidya et al. "Protein-Resistant Properties of SilcoTek's Dursan® Coating." SilcoTek. (2017).
Vaidya et al. Protein-resistant properties of a chemical vapor deposited alkyl-functional carboxysilane coating characterized using quartz crystal microbalance. Appl. Surface Sci. 364(2016): 896-908.
Velox Plus, Dec. 20, 2018.
Waters Quality Parts®, Chromatography Columns and Supplies Catalog. Dec. 2014.
Wyndham et al. "Characterization and Evaluation of C18 HPLC Stationary Phases Based on Ethyl-Bridged Hybrid Organic/Inorganic Particles." Anal. Chem. 75.24(2003): 6781-6788.
Xue et al. "Surface-modified anodic aluminum oxide membrane with hydroxyethyl celluloses as a matrix for bilirubin removal." J. Chromatog. B. 912(2013):1-7.
Yang et al. "Synergistic Prevention of Biofouling in Seawater Desalination by Zwitterionic Surfaces and Low-Level Chloronation." Adv. Mater. 26(2014): 1711-1718.
International Search Report and Written Opinion issued in International Application No. PCT/IB2021/050875 dated Aug. 12, 2021.

(56) References Cited

OTHER PUBLICATIONS

Itoh et al. "High-performance liquid chromatographic separation of nucleic acids on a fluorocarbon-bonded silica gel column." J. Chromatogr. A. 662(1994): 95-99.
Chen et al. "Extraction and ultra-performance liquid chromatograpic analysis of adenosine phosphates in royal jelly." Chin. J. Chromatogr. 26.6(2008): 736-739.
Dai. "Profiling of Endogenous Metabolites Using Time-of-Flight LC/MS with Ion-Pair Reverse Phase Chromatography." Agilent Technologies(2017).
De Vijlder et al. "Study on the loss of nucleoside mono-, di- and triphosphates and phosphorylated peptides to a metal-free LC-MS hardware." Int. J. Mass Spectrometry. 304(2011): 83-90.
Ostergaard, Elsebet et al. Mitochondrial encephalomyopathy with elevated methylmalonic acid is caused by SUCLA2 mutations. Brain (2007) 130, 853-861 (Year: 2007).
Rioseras, Alberto Tejera. Real-Time Monitoring of Tricarboxylic Acid Metabolites in Exhales Breath. Anal. Chem. 2018. 90. 6453-6460. (Year: 2018).
Sinha et al. "Analysis and Purification of Synthetic Nucleic Acids Using HPLC." Curr. Protoc. Nucleic Acid Chem. (2015). 61: 10.5.1-10.5.39.
Bohlin et al. "Surface and Porous Structure of Pigment Coatings, Interactions with flexographic ink and effects of print quality." Dissertation.: Karlstand University Studies. (2013).
Faucheu et al. "Relating Gloss Loss to Topographical Features of a PVDF Coating." (2004).
Myers et al. "On-column nitrosation of amines observed in liquid chromatography impurity separations employing ammonium hydroxide and acetonitrile as mobile phase." J. Chromatogr. A. 1319(2013): 57-64.

* cited by examiner

Adenine

Adenosine

Adenosine Monophosphate (AMP)

Adenosine Diphosphate (ADP)

Adenosine Triphosphate (ATP)

Favipiravir

Favipiravir Ribofuranosyl Monophosphate

Favipiravir Ribofuranosyl Diphosphate

Favipiravir Ribofuranosyl Triphosphate

Redemsivir

Remdesivir (Nucleotide Monophosphate)

Remdesivir (Nucleotide Diphosphate)

Remdesivir (Nucleotide Triphosphate)

| | | RT | Area | Height | PW @10% | Asymm @10% |
|---|---|---|---|---|---|---|
| ATP | Average | 0.190 | 5.0E+04 | 3.1E+06 | 1.005 | 1.620 |
| | Std Dev | 0.000 | 1.9E+03 | 1.1E+05 | 0.009 | 0.000 |
| | %RSD | 0.21% | 3.82% | 3.68% | 0.93% | 0.00% |
| Adenosine | Average | 0.269 | 1.3E+05 | 6.4E+06 | 1.155 | 2.064 |
| | Std Dev | 0.000 | 7.6E+03 | 2.9E+05 | 0.030 | 0.054 |
| | **%RSD** | **0.15%** | **5.90%** | **4.50%** | **2.59%** | **2.60%** |

LIQUID CHROMATOGRAPHY BASED DETECTION AND QUANTITATION OF PHOSPHO PRODRUGS AND THEIR ACTIVE METABOLITES

RELATED APPLICATIONS

This application claims the benefit of and priority to U.S. provisional patent application Ser. No. 63/020,317, filed May 5, 2020, and entitled "Liquid Chromatography Based Quantitation of Phospho Prodrugs and Their Active Metabolites," the entire disclosure of which is incorporated herein by this reference.

FIELD OF THE TECHNOLOGY

The present disclosure relates to the use of vapor deposition coated flow paths for improved chromatography and sample analysis using liquid chromatography-mass spectrometry (LC/MS) or liquid chromatography-ultra violet detection (LC/UV). More specifically, this technology relates to separating and quantitation of analytes (phospho prodrugs and their active metabolite) from a sample matrix (e.g., mammalian blood, plasma) using chromatographic devices and fluidic systems having coated flow paths. The present disclosure also relates to methods providing improved recovery, peak shape, and dynamic range in an LC-MS or LC-UV method for the quantitation of prodrugs and their active metabolites.

BACKGROUND

Nucleic acid polymerases are enzymes that catalyze the replication and transcription of genetic information. Being that they play such a pivotal biological role, it is not surprising that they are also a very important druggable target. Structural differences between viral polymerases and human polymerases has given hope for efficacious antiviral treatments. There are many different types of viruses, but each will store genetic information in either a DNA or RNA genome. Viral DNA or RNA polymerases can thus be targeted with substrate analogs to inhibit productive replication. In an ordinary replication event, the substrate is a nucleotide triphosphate, such as adenosine triphosphate (ATP). Alternatively, a nucleotide analog can be dosed to disrupt important events, like chain termination.

In the case of SARS-COV-2 (i.e., COVID-19), an RNA polymerase is responsible for genome replication. Two antivirals with promising in vitro efficacy against the novel coronavirus are being tested on patients. One is favipiravir (6-fluoro-3-hydroxy-2-pyrazinecarboxamide), a nucleobase analog and prodrug that is metabolized into favipiravir-ribofuranosyl-5'-triphosphate (favipiravir-RTP). It is believed that a phosphoribosyltransferase is responsible for the cellular activation of the drug. In its triphosphate activated form, it becomes a potent effector of RNA replication in viruses, such as influenza and Ebola (i.e., a polymerase inhibitor). There is promise for favipiravir to inhibit the replication of SARS-COV-2 and a number of patient trials are underway globally. Another viable drug for SARS-COV-2 treatment is remdesivir, a phosphoramidate prodrug that is converted intracellularly into an active triphosphate form. The promise of these antivirals and others like them has led to an explosion of new clinical studies.

In clinical trials, patients are closely monitored throughout a dose regimen to gather information on so-called pharmacokinetic and pharmacodynamic profiles. In instances of the compassionate use of an investigation dug, patients are also frequently monitored to avoid subtherapeutic dosing and avoid toxic plasma concentrations. In both cases, blood samples are regularly acquired and assays are performed to measure the concentration of the administered drug and to observe its effect it has on the body including the quantity of active metabolites created in vivo by the subject. In both cases, enzyme linked immunosorbent assays can be employed.

In some cases, it is of interest to monitor biotransformation events by means of liquid chromatography paired with optical detection or with mass spectrometry. To date, nucleotide analogs have largely been separated using ion pairing reagents, like tributylamine. This serves to improve the retention of the hydrophilic, acidic analytes, and it suppresses problematic metal adsorption-based sample losses. On the other hand, a strong ion pairing reagents, like tributylamine, can suppress ionization and make it a challenge to switch back to other LC-MS techniques.

Ultimately though, there remains a need for quicker turnaround in these assays and for them to be made more reliable and robust. For example, phospho prodrugs and their metabolites interact with metal components, which leads to known challenges (e.g., secondary interactions) in their separation and analysis by liquid chromatography. The desire to have high pressure capable chromatographic systems with minimal dispersion has required that flow paths decrease in diameter and be able to withstand increasingly high pressures at increasingly fast flow rates. As a result, the material of choice for chromatographic flow paths is often metallic in nature. This is despite the fact that characteristics of certain analytes, for example, biomolecules, proteins, glycans, peptides, oligonucleotides, anionic metabolites, and zwitterions like amino acids and neurotransmitters, are known to have unfavorable interactions, so called chromatographic secondary interactions, with metallic surfaces.

The proposed mechanism for metal specific binding interactions requires an understanding of the Lewis theory of acid-base chemistry. Pure metals and metal alloys (along with their corresponding oxide layers) have terminal metal atoms that have characteristics of a Lewis acid. More simply, these metal atoms show a propensity to accept donor electrons. This propensity is even more pronounced with any surface metal ions bearing a positive charge. Analytes with sufficient Lewis base characteristics (any substance that can donate non-bonding electrons) can potentially adsorb to these sites and thus form problematic non-covalent complexes. It is these substances that are defined as metal-interacting analytes.

For example, analytes having phosphate groups are excellent polydentate ligands capable of high affinity metal chelation. This interaction causes phosphorylated species to bind to the flow path metals thus reducing the detected amounts of such species, a particularly troublesome effect given that phosphorylated species are frequently the most important analytes of an assay. To make the detection and monitoring of phosphor prodrugs and their active metabolites more reliable and robust, secondary interactions with the metallic chromatographic surfaces have to be accounted for.

In addition, there is a need for achieving greater selectivity for the detection and quantification of a prodrug and its phosphorylated metabolites.

Ongoing efforts to the secondary chromatographic interactions of analytes with metal chromatographic surfaces in an effort to facilitate chromatographic separation having higher resolutions are therefore needed, especially in critical pharmacokinetic and pharmacodynamic profiles and prodrug treatment development methods.

SUMMARY

In general, the present technology relates to methods for the LC-based detection and/or quantitation of phospho prodrugs and their active metabolites (e.g., phosphorylated metabolites) through the advantageous use of vapor deposition coated LC surfaces. In some embodiments, the active metabolites of the phosphor prodrug results in the inhibition of transcription of RNA, which may be useful for treating viruses within mammalians.

The present technology can also feature methods and devices that allow for improved detection and/or quantification of a phosphor prodrug, such as, for example, remdesivir. The present technology can also be used for the detection and quantification of remdesivir and its phosphorylated metabolites. That is, the present technology can be used to determine the presence and/or concentration of remdesivir and its active metabolites present in a sample. The present technology uses a combination of an alkylsilyl coating along at least some portions of a wetted fluid path through a chromatographic device in combination with using a mixed-mode stationary phase. As a result of this combination, an ion pairing reagent need not be used in the separation allowing for better (e.g., higher resolution or separation) or faster, easier to utilize detectors, such as optical detectors to be incorporated in the methods. An ion pairing reagent is a base, not including ammonium, that contains one or more C2 to C18 containing substituents and is cationic under the conditions of the mobile phase. Example ion pairing reagents for the active metabolites of a polymerase inhibitor include but are not limited to triethyl amine, diisopropylethyl amine, octylamine, ethyl amine, butylamine, tributylamine, or isopropylamine.

A polymerase inhibitor is a drug that acts against viruses by interfering with the action of enzymes viruses use to replicate (e.g., build up their own genetic material). A prodrug is a drug that is in an inactive form when administered to a patient/subject, but is converted in vivo (e.g., in the blood) to an active compound. In one instance, the conversion to an active compound is the result of an anabolic reaction to create or build up one or more metabolites. In another instance, the conversion to an active compound involves the release of the active compound from the prodrug in vivo, a catabolic reaction. In some instances, both catabolic and anabolic processes occur during the in vivo conversion of the prodrug to one or more active compounds.

Fast and reliable studies are needed in the fight against viruses such as SARS-COV-2. To prevent the loss of data (e.g., prevent loss of analyte due to secondary interactions with metallic components) and to improve the resolution and peak shape so as to provide reliable quantitation of phosphor prodrugs and their active metabolites within a mammalian plasma sample, the present technology utilizes LC equipment having a vapor deposited alkylsilyl (e.g., C2, C2C10) coating on all metallic wetted surfaces within an LC system. The vapor deposited alkylsilyl coating creates low bind surfaces (LBS) to eliminate the challenges faced with metal-sensitive analytes.

The present technology includes a coating, such as alkylsilyl coating, that can provide a LBS to increase analyte recovery, sensitivity, as well as reproducibility by minimizing the analyte/surface interactions that can lead to sample losses. For example, a chromatographic column, and other LC components both upstream and downstream of the column, incorporate the coating of the present disclosure. In the present disclosure, metal sensitive compounds, such as phospho prodrugs and their active biological metabolites (e.g., polymerase inhibitors) were tested using a conventional uncoated LC system hardware, a coated column, and a LC system including a coated flow path (i.e., coated column, coated hardware both upstream and downstream of the coated column). Methods of quantitation are greatly improved (e.g., separation and peak height/shape) in the analysis of phospho prodrugs and their metabolites contained in a single mammalian (e.g., human, monkey, etc.) plasma sample.

Non-specific binding of phosphorylated compounds within chromatographic systems negatively impacts the ability to detect and accurately quantify these molecules. The mechanism of non-specific binding is due to the interaction of the analyte with metallic surfaces in the flow path. This unwanted interaction leads to a reduced amount of analyte detected, reduced repeatability of analysis, and inaccurate quantitation. Secondary interaction challenges become especially pronounced at lower concentrations where the percentage of analyte that is bound to the surface is very high relative to the total concentration and/or when active metabolite peaks overlap.

Existing techniques to mitigate these interactions, such as system passivation with nitric acid, are time consuming and only produce temporary performance gains. It is difficult to determine when the system is fully passivated and ready to operate. If attempts are made to obtain data for quantitative studies before full passivation is reached, the lower end of the curve would not be detected because the analyte still has metallic surfaces it can bind to. In the present technology, coating of the metallic surfaces defining the flow path offers demonstrably better chromatographic peak area.

For example, an alkylsilyl coating (e.g., C2 coating, C2C10 coating) on the surface area defining the flow path of a chromatographic system can minimize the interactions between phosphorylated compounds (including multi-phosphorylated compounds) and the metallic surfaces of chromatographic flow paths. Consequently, the coated metallic surfaces improve liquid chromatography separations for phosphorylated compounds-including the separation of multiple phosphorylated compounds as in the case of a phosphor drug and its active metabolites in a blood sample. The use of alkylsilyl coatings on metal flow paths allows the use of metal chromatographic flow paths, which are able to withstand high pressures at fast flow rates, while minimizing the secondary chromatographic interactions between phosphorylated compounds and the metal. These components made of high pressure material and modified with a coating can be tailored so that the internal flow paths reduce secondary chromatographic interactions. The coating covers the metallic surfaces that are exposed to the fluidic path.

In one aspect, the technology is directed to a method of detecting remdesivir in a sample. The method includes: providing the sample to a chromatography column housing a mixed-mode stationary phase disposed therein, the chromatography column comprising an alkylsilyl coating covering at least a portion of wetted internal surfaces of the chromatography column; separating and eluting remdesivir from the sample by applying a gradient of a mobile phase solution comprising ammonium acetate; and detecting remdesivir in the eluent using a mass spectrometry detector or an optical detector. The alkylsilyl coating can include or be formed of bis(trichlorosilyl) ethane or bis(trimethoxysilyl) ethane.

The above aspect can include one or more of the following features. In some embodiments, the mobile phase solution does not include an ion pairing reagent. In certain embodiment the mobile phase solution has a pH within the range of 4.8 to 7, such as 5, or 6.8. In certain embodiments, the method further includes detecting one or more metabolites of remdesivir (e.g., phosphorylated metabolites) in the eluent using the mass spectrometry detector or the optical detector. The gradient can be a linear gradient. In some embodiments, the gradient is achieved by varying a concentration of ammonium acetate. In certain embodiments, the gradient is achieved by varying concentration of acetonitrile in the mobile phase solution. In certain embodiment the concentration of acetonitrile ranges from 0 to 60 volume percent.

In another aspect, the technology is directed to a chromatography column for analyzing a sample including a phospho prodrug. The column includes a metal body having internal surfaces defining a flow path from an inlet to an outlet of the column; a mixed-mode stationary phase having a reverse phase/anion-exchange mixed mode chemistry, the mixed-mode stationary phase is housed within the flow path, distinct from the metal body, and secured within the metal body with at least one frit; and an alkylsilyl coating covering the at least one frit.

The above aspect can include one or more of the following features. The alkylsilyl coating can cover not just the at least one frit, but also can extend along a portion of body wells between the inlet and the outlet (e.g., interior surfaces of the column defined by the metal body). In some embodiments, the alkylsilyl coating includes or is formed of bis (trichlorosilyl) ethane or bis(trimetheoxysilyl) ethane.

In another aspect, the technology is directed to a kit for analyzing remdesivir in a sample. The kit can be used to analyze remdesivir by itself in a sample, or in some instances to separate and analyze remdesivir and its phosphorylated metabolites from a sample. The kit includes a chromatography column having an alkylsily coating and a mixed-mode stationary phase (e.g., the chromatography column described above) and a vial or container of ammonium acetate or ammonium acetate solution.

The above aspect can include one or more of the following features. The ammonium acetate solution can have a pH between 4.8 and 7, such as for example, 4.8, 5, 6.8 or 7. In some embodiments, the kit further includes instructions for separating and eluting a sample including remdesivir. In some embodiments, the instructions provide for a gradient separation and elution of remdesivir from the sample. The instructions may also provide information on detecting using a mass-spectrometry detector or a UV (optical) detector of the separated and eluted remdesivir and/or one or more of its phosphorylated metabolites. In some embodiments, the ammonium acetate solution is free of (e.g., does not contain) an ion pairing reagent.

The above aspects and features of the present technology provide numerous advantages over the prior art. For example, by utilizing a vapor deposited coated LC system in the analysis of phospho prodrugs and their active metabolites, accurate quantitation of the prodrug and its active metabolites can be achieved than by conventional methods. This information is crucial for obtaining pharmacokinetic and pharmacodynamic profiles and for developing successful treatment in the fight against viruses. Accurate and reliable quantification of the phospho prodrug (and in some instances, its active metabolites from a blood sample) can be used for impurity testing and lot releasing testing.

BRIEF DESCRIPTION OF THE DRAWINGS

The technology will be more fully understood from the following detailed description taken in conjunction with the accompanying drawings, in which:

FIG. 4A illustrates the chemical structure of adenine.

FIG. 4B illustrates the chemical structure of adenosine.

FIG. 4C illustrates the chemical structure of adenosine monophosphate.

FIG. 4D illustrates the chemical structure of adenosine diphosphate.

FIG. 4E illustrates the chemical structure of adenosine triphosphate.

FIG. 4F illustrates the chemical structure of favipiravir.

FIG. 4G illustrates the chemical structure of favipiravir ribofuranosyl monophosphate.

FIG. 4H illustrates the chemical structure of favipiravir ribofuranosyl diphosphate.

FIG. 4I illustrates the chemical structure of favipiravir ribofuranosyl triphosphate.

FIG. 4J illustrates the chemical structure of remdesivir.

FIG. 4K illustrates the chemical structure of remdesivir nucleotide monophosphate (RMP).

FIG. 4L illustrates the chemical structure of remdesivir nucleotide diphosphate (RDP).

FIG. 4M illustrates the chemical structure of remdesivir nucleotide triphosphate (RTP).

FIG. 5A provides a chromatogram of AMP, ADP, and ATP from a standard (uncoated) column from the 5th injection.

FIG. 5B provides a chromatogram of AMP, ADP, and ATP from a C2 coated chromatographic column also from the 5th injection.

FIG. 7A provides the chromatographic results for a standard, uncoated stainless steel column.

FIG. 7B provides the chromatographic results for a C2 coated column, however chromatographic components both upstream and downstream of the column remained uncoated.

FIG. 7C provides the chromatographic results for a C2 coated column in a C2 coated chromatographic system.

FIG. 8A provides a chromatograph of the repeat injections of 400 pg ATP and 195 pg adenosine.

FIG. 8B provides a table of the repeat injections of 400 pg ATP and 195 pg adenosine.

FIG. 10A provides the calibration curves for ATP.

FIG. 10B provides the calibration curves for ADP.

FIG. 10C provides the calibration curves for AMP.

FIG. 10D provides the calibration curves for adenosine.

DETAILED DESCRIPTION

Figure 1:
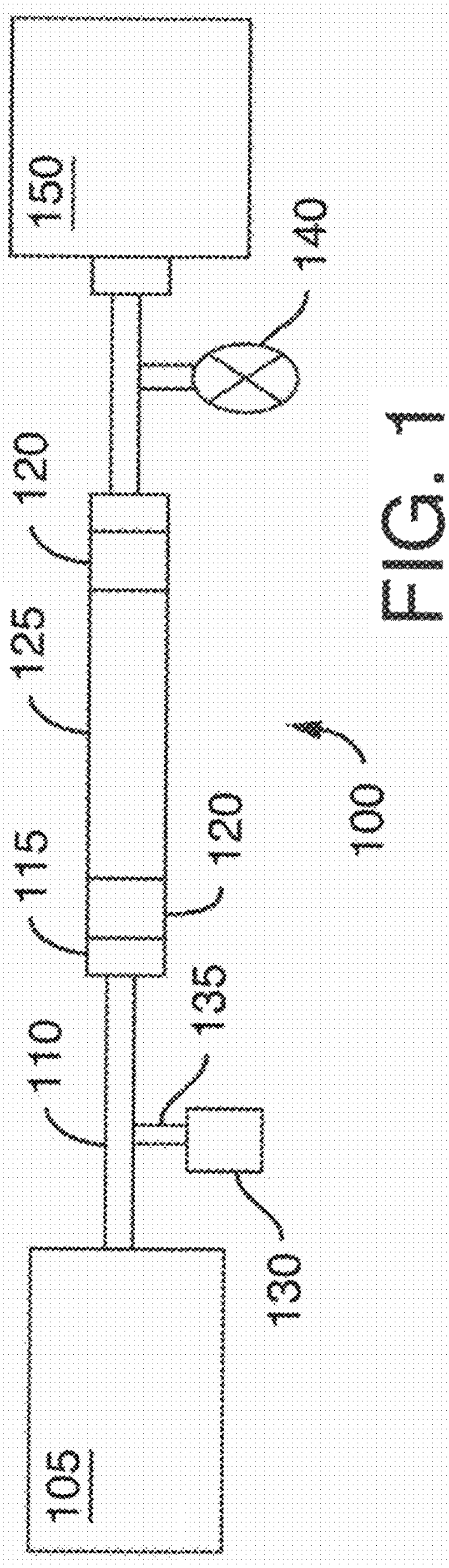
FIG. 1 is a schematic of a chromatographic flow system including a chromatography column and various other components, in accordance with an illustrative embodiment of the technology. A fluid is carried through the chromatographic flow system with a fluidic flow path extending from a fluid manager to a detector, such as a MS detector.

Polymerase inhibitors, due to their ability to disrupt virus replication in the body, are an important part in the fight against novel viruses, such as SARS-COV-2. A number of polymerase inhibitors are prodrugs that are converted into the active form in vivo. Two such drugs include favipiravir and remdesivir, which both are phospho prodrugs. The active forms of these prodrugs result from anabolic processes to attach phosphate groups. In the case, of remdesivir, the active form created in vivo results from a catabolic first step to remove a portion of the prodrug followed by anabolic processes to attach the phosphate groups. In order to develop treatment methods using one or more of these prodrugs, pharmacokinetic and pharmacodynamic profiles, generated through the sensitive analysis of a mammalian subject's plasma must be developed and vetted. However, the phosphorylated compounds residing in the active metabolites (i.e., phosphorylated metabolites) present quantitation and analysis challenges due to secondary interactions arising from metallic chromatographic components. Further, ion pairing reagents typically used with mixed-mode separation media can add to resolution and analysis challenges.

In general, the present disclosure is related to coating columns (and other chromatographic hardware) with low-binding surfaces to increase analyte recovery, reproducibility and sensitivity by minimizing negative analyte/surface interactions that can lead to sample losses. Coated columns in accordance with an embodiment of the present technology are available under the tradename of MAXPEAK™ (Waters Corporation, Milford, MA). The present disclosure addresses the problematic binding of compounds on metallic surfaces of chromatographic systems. For example, phosphorylated compounds can interact with stainless steel to reduce analyte recovery and that this interaction can increase with the number of phosphorylated moieties present.

In addition, coating the system to have LBS minimizes uncertainty of the chromatographic system performance. Permanent passivation (or at least semi-permanent passivation, i.e., useable lifetime of a consumable) can be provided by the coating the column and surrounding chromatographic hardware. For example, the system does not need to be passivated after each wash, and passivation does not effectively diminish after each wash or flowing. Consequently, the analyte detected using LC/MS or LC/UV can be depended upon as an accurate assessment of the analyte present.

One method of coating for LBS is the use of alkylsilyl coatings (e.g., a vapor deposited C2 coating, a vapor deposited C2C10 coating). In some aspects, the alkylsilyl coating acts as a bioinert, low-bind coating to modify a flow path to address flow path interactions with an analyte, such as a metal-sensitive analyte. That is, the bioinert, low-bind coating minimizes surface reactions with the metal interacting compounds and allows the sample to pass along a flow path without clogging, attaching to surfaces, or change in analyte properties. The reduction/elimination of these interactions is advantageous because it allows for accurate quantitation and analysis of a sample containing phosphorylated compounds or other metal-sensitive compounds. Further, for samples with low concentrations of analyte, MS detection is possible. The coating which creates LBS along the flow path prevents/significantly minimizes analyte loss to the metallic surface walls, thereby allowing low concentration of analytes to be detected.

FIG. 1 is a representative schematic of a chromatographic flow system/device 100 that can be used to separate analytes, such as phosphorylated compounds (e.g., metabolites in a blood sample taken from a mammalian subject who was administered a phosphor prodrug). Chromatographic flow system 100 includes several components including a fluid manager system 105 (e.g., controls mobile phase flow through the system), tubing 110 (which could also be replaced or used together with micro fabricated fluid conduits), fluid connectors 115 (e.g., fluidic caps), frits 120, a chromatography column 125, a sample injector 135 including a needle (not shown) to insert or inject the sample into the mobile phase, a vial, sinker, or sample reservoir 130 for holding the sample prior to injection, a detector 150, such as a mass spectrometer, and a pressure regulator 140 for controlling pressure of the flow. Interior surfaces of the components of the chromatographic system/device form a fluidic flow path that has wetted surfaces. The fluidic flow path can have a length to diameter ratio of at least 20, at least 25, at least 30, at least 35 or at least 40.

At least a portion of the wetted surfaces can be LBS by coating with an alkylsilyl coating to reduce secondary interactions by tailoring hydrophobicity. The coating can be applied by vapor deposition. As such, methods and devices of the present technology provide the advantage of being able to use high pressure resistant materials (e.g., stainless steel) for the creation of the flow system, but also being able to tailor the wetted surfaces of the fluidic flow path to provide the appropriate hydrophobicity so deleterious interactions or undesirable chemical effects on the sample can be minimized. In some examples, the coating of the flow path is non-binding with respect to the analyte, such as a metal-sensitive compound (e.g., a phosphorylated compound, a pharmaceutical drug, biological active metabolite). Consequently, the analyte, such as phosphorylated compounds, does not bind to the coating of the flow path.

The alkylsilyl coating can be provided throughout the system from the tubing or fluid conduits 110 extending from the fluid manager system 105 all the way through to the detector 150. The coatings can also be applied to portions of the fluidic fluid path (e.g., at least a portion of the fluidic path). That is, one may choose to coat one or more components or portions of a component and not the entire fluidic path. For example, the internal portions of the column 125 and its frits 120 and end caps 115 can be coated whereas the remainder of the flow path can be left unmodified. Further, removable/replaceable components can be coated. For example, the vial or sinker 130 containing the sample reservoir can be coated as well as frits 120.

In one aspect, the flow path of the fluidic systems described herein is defined at least in part by an interior surface of tubing. In another aspect, the flow path of the fluidic systems described herein is defined at least in part by an interior surface of microfabricated fluid conduits. In another aspect, the flow path of the fluidic systems described herein is defined at least in part by an interior surface of a column. In another aspect, the flow path of the fluidic systems described herein is defined at least in part by passageways through a frit. In another aspect, the flow path of the fluidic systems described herein is defined at least in part by an interior surface of a sample injection needle. In another aspect, the flow path of the fluidic systems described herein extends from the interior surface of a sample injection needle throughout the interior surface of a column. In another aspect, the flow path extends from a sample reservoir container (e.g., sinker) disposed upstream of and in fluidic communication with the interior surface of a sample injection needle throughout the fluidic system to a connector/port to a detector.

In some embodiments, only the wetted surfaces of the chromatographic column and the components located upstream of the chromatographic column are LBS, coated with the alkylsilyl coatings described herein, while wetted surfaces located downstream of the column are not coated. In other embodiments, components both the upstream and downstream of the column (and including the column) are coated. The coating can be applied to the wetted surfaces via vapor deposition. Similarly, the "wetted surfaces" of labware or other fluid processing devices may benefit from alkylsilyl coatings described herein. The "wetted surfaces" of these devices not only include the fluidic flow path, but also elements that reside within the fluidic flow path. For example, frits and/or membranes within a solid phase extraction device come in contact with fluidic samples. As a result, not only the internal walls within a solid phase extraction device, but also any frits/membranes are included within the scope of "wetted surfaces." All "wetted surfaces" or at least some portion of the "wetted surfaces" can be improved or tailored for a particular analysis or procedure by including one or more of the coatings described herein. The term "wetted surfaces" refers to all surfaces within a separation device (e.g., chromatography column, chromatography injection system, chromatography fluid handling system, frit, etc.). The term can also apply to surfaces within labware or other sample preparation devices (e.g., extraction devices, protein precipitation devices) that come into contact with a fluid, especially a fluid containing an analyte of interest.

Further information regarding the coating and the deposition of coatings in accordance with the present technology is available in US 2019/0086371, which is hereby incorporated by reference.

In some examples, coating the flow path includes uniformly distributing the coating about the flow path, such that the walls defining the flow path are entirely coated. In some embodiments, uniformly distributing the coating can provide a uniform thickness of the coating about the flow path. In general, the coating uniformly covers the wetted surfaces such that there are no "bare" or uncoated spots.

In certain embodiments, the coating is applied and covers just one or more of the frits. That is, the coating need not cover the walls within the body that houses the stationary phase. Rather, the coating could instead be positioned just on one or more of the frits that retain the stationary phase in the housing. The frits provide a large percentage of the wetted fluid path. As a result, in some instances, coating just one or both of the frits is enough to provide the advantage.

Commercially available vapor deposition coatings can be used in the disclosed systems, devices, and methods, including but not limited to vapor deposited coatings provided under the trademarks DURSAN® and DURSOX® (commercially available from SilcoTek Corporation, Bellefonte, PA).

The coatings described above can be used to create LBS and can tailor a fluidic flow path (or a portion thereof, e.g., frits) of a chromatography system for the separation of a sample. The coatings can be vapor deposited. In general, the deposited coatings can be used to adjust the hydrophobicity of internal surfaces of the fluidic flow path that come into contact with a fluid (i.e. wetted surfaces or surfaces coming into contact with the mobile phase and/or sample/analyte). By coating wetted surfaces of one or more components of a flow path within a chromatography system, a user can tailor the wetted surfaces to provide a desired interaction (i.e., a lack of interaction) between the flow path and fluids therein (including any sample, such as a sample containing phosphorylated compound, within the fluid).

Figure 2:
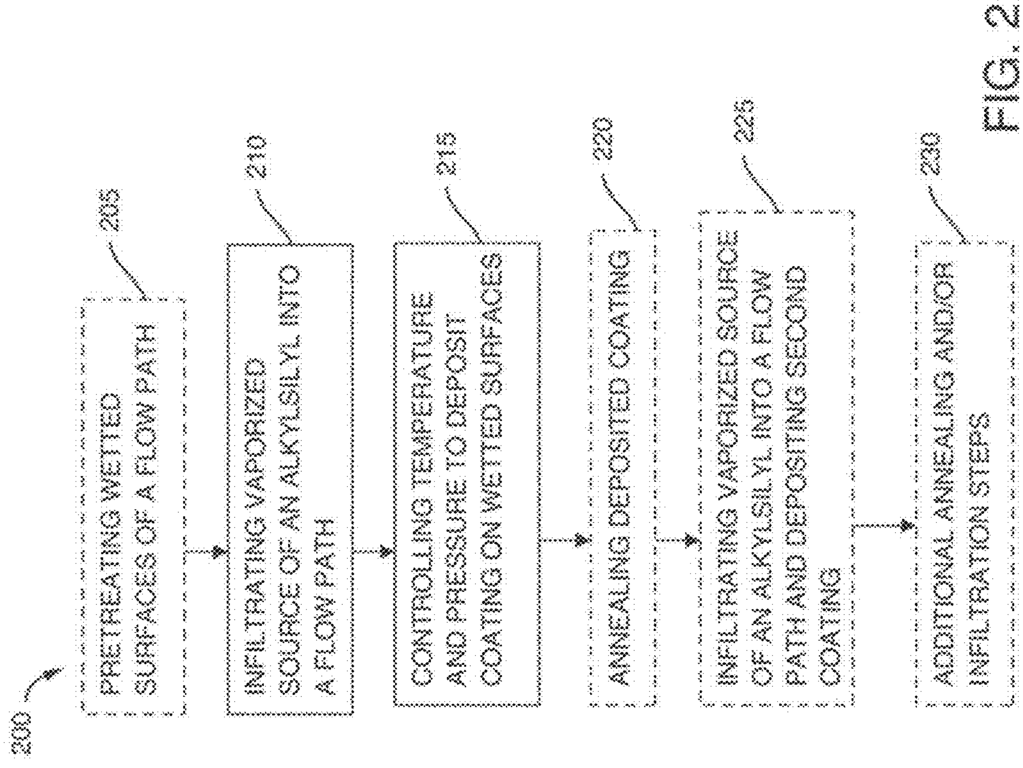
FIG. 2 is a flow chart of a method of coating a fluidic path (such as a fluidic path in a chromatography system) according to an illustrative embodiment of the technology.

FIG. 2 is a flow chart illustrating method 200 for creating a LBS by tailoring a fluidic flow path for separation of a sample including phosphorylated compounds. The method has certain steps which are optional as indicated by the dashed outline surrounding a particular step. Method 200 can start with a pretreatment step (205) for cleaning and/or preparing a flow path within a component for tailoring. Pretreatment step 205 can include cleaning the flow path with plasma, such as oxygen plasma. This pretreatment step is optional.

Next, an infiltration step (210) is initiated. A vaporized source of an alkylsilyl compound (e.g., C2) is infiltrated into the flow path. The vaporized source is free to travel throughout and along the internal surfaces of the flow path. Temperature and/or pressure is controlled during infiltration such that the vaporized source is allowed to permeate throughout the internal flow path and to deposit a coating from the vaporized source on the exposed surface (e.g., wetted surfaces) of the flow path as shown in step 215. Additional steps can be taken to further tailor the flow path. For example, after the coating is deposited, it can be heat treated or annealed (step 220) to create cross linking within the deposited coating and/or to adjust the contact angle or hydrophobicity of the coating. Additionally or alternatively, a second coating of alkylsilyl compound (having the same or different form) can be deposited by infiltrating a vaporized source into the flow path and depositing a second or additional layers in contact with the first deposited layer as shown in step 225. After the deposition of each coating layer, an annealing step can occur. Numerous infiltration and annealing steps can be provided to tailor the flow path accordingly (step 230).

Figure 3:
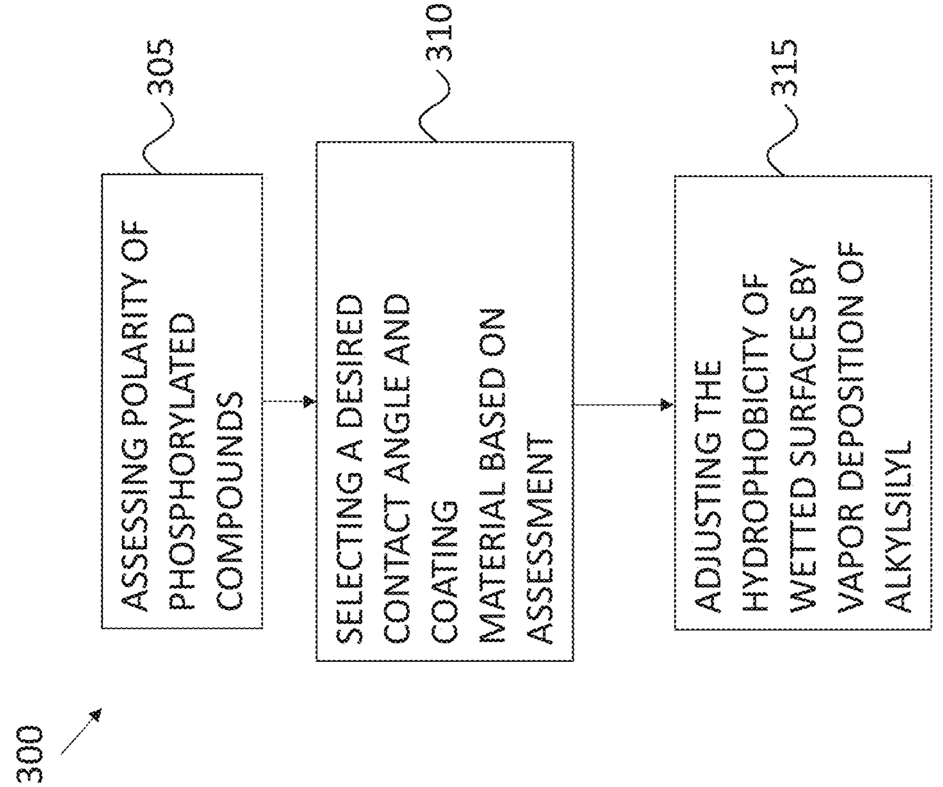
FIG. 3 is a flow chart showing a method of tailoring a fluidic flow path for separation of a sample including a biomolecule, in accordance with an illustrative embodiment of the technology.

FIG. 3 provides a flow chart illustrating a method (300) of creating a LBS by tailoring a fluidic flow path for separation of a sample including a analyte, such as phosphorylated compounds. The method can be used to tailor a flow system for use in isolating, separating, and/or analyzing phosphorylated compounds. In step 305, phosphorylated compounds are assessed to determine polarity. Understanding the polarity will allow an operator to select (by either look up table or make a determination) a desired coating chemistry and, optionally, contact angle as shown in step 310.

In some embodiments, in addition to assessing the polarity of phosphorylated compounds, the polarity of a stationary phase to be used to separate the phosphorylated compounds (e.g., stationary phase to be included in at least a portion of the fluidic flow path) is also assessed. A chromatographic media (e.g., stationary phase) can be selected based on metal-sensitive compounds or phosphorylated compounds in the sample. Understanding the polarity of both the phosphorylated and/or metal-sensitive compounds and the stationary phase is used in certain embodiments by the operator to select the desired coating chemistry and contact angle in step 310. The components to be tailored can then be positioned within a chemical infiltration system with environmental control (e.g., pressure, atmosphere, temperature, etc.) and precursor materials are infiltrated into the flow path of the component to deposit one or more coatings along the wetted surfaces to adjust the hydrophobicity as shown in step 315. During any one of infiltration, deposition, and condition steps (e.g. annealing), coatings deposited from the infiltration system can be monitored and if necessary precursors and or depositing conditions can be adjusted if required allowing for fine tuning of coating properties.

The coated chromatographic hardware is utilized in the present technology to analyze a phospho prodrug and its biological metabolites (including the active metabolites) in a plasma sample. That is, the coated chromatographic hardware of the present technology is utilized to separate and analyze the phosphorylated compounds (e.g., the biological metabolites as well as prodrug remainder) in a mammalian subject's plasma or blood sample. The information uncovered in the analysis allows of the quantitation of the phosphorylated compounds and can be used in pharmacokinetic and pharmacodynamics studies. Further, this information can be used for determination of dosing regiments and in diagnostic dosing testing for a particular patient. Further, accurate information regarding the phosphor prodrug can be used for impurity testing and lot release testing which will be needed for large scale production.

Figure 4A:
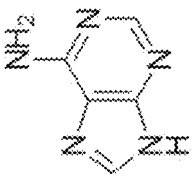
FIGS. 4A-4M illustrate the chemical formulae of various prodrugs and their metabolites.
Figure 4B:
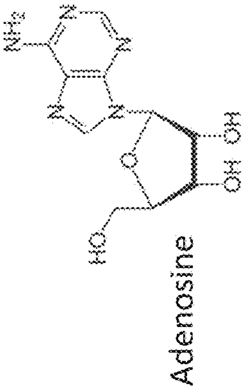
Figure 4C:
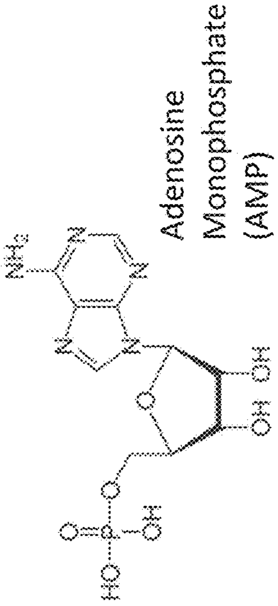
Figure 4D:
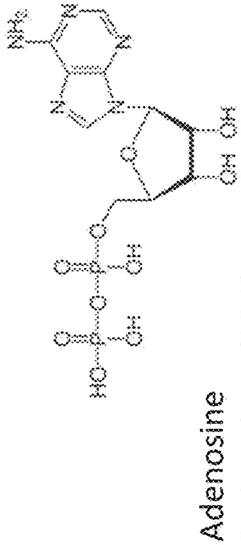
Figure 4E:
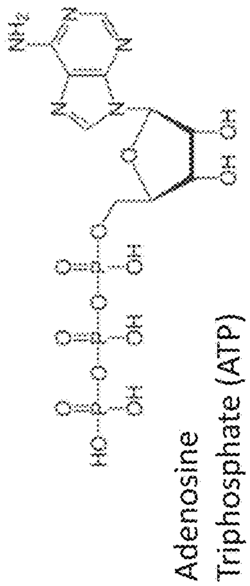
Figure 4F:
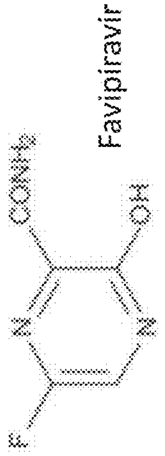
Figure 4G:
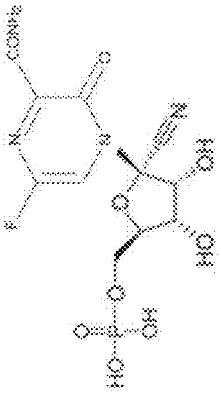
Figure 4H:
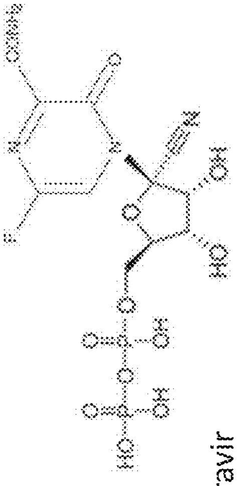
Figure 4I:
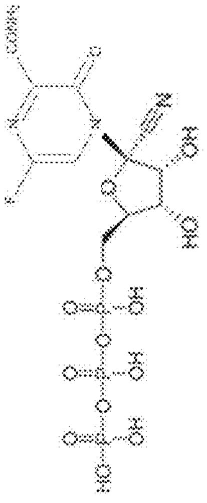
Figure 4J:
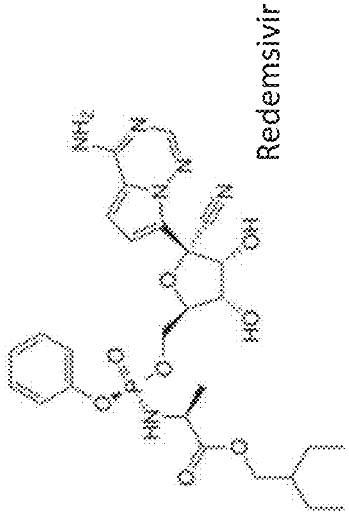
Figure 4K:
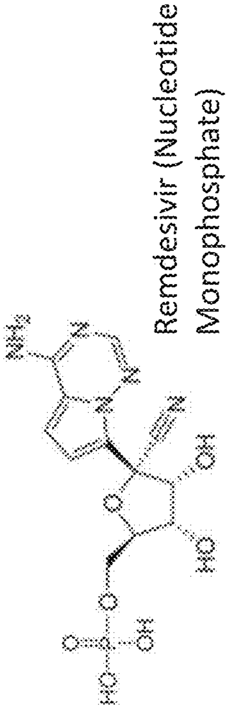
Figure 4L:
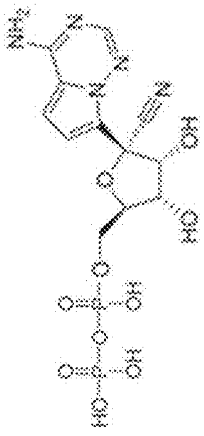

Two phospho prodrugs that have been classified as polymerase inhibitors (antiviral polymerase inhibitors) include favipiravir and remdesivir. As shown in FIG. 4F, favipiravir, when administered to a mammalian subject forms at least three metabolites, favipiravir ribofuranosyl monophosphate (FIG. 4G), favipiravir ribofuransoyl disphosphate (FIG. 4H), and favripiravir ribofuranosyl triphosphate (FIG. 4I). The favipiravir metabolites are formed by an anabolic process to build the phosphate groups. Shown in FIG. 4J is another antiviral polymerase inhibitor remdesivir. Remdesivir also has three phosphorylated metabolites. However, unlike favripiravir, remdesivir undergoes a catabolic process to remove the left hand portion of the prodrug prior to building the phosphate groups remdesivir nucleotide monophosphate (FIG. 4K), remdesivir nucleotide diphosphate (FIG. 4L), and remdesivir nucleotide triphosphate (FIG. 4M).

Remdesivir is an investigational small-molecule antiviral drug that has demonstrated activity against RNA viruses in several virus families, including coronaviruses. Remdesivir is a prodrug of a nucleoside, both of which are metabolized intracellularly into the active nucleoside triphosphate. Originally, this prodrug was developed to treat Ebola virus infection. Currently, remdesivir has been the focus of extensive research on repurposing antiviral medications to be used alone or in combination with other therapeutics for the treatment of the SARS-COV-2 infection.

Figure 4M:
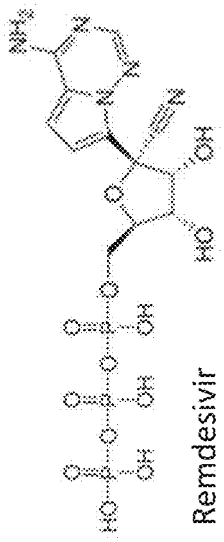

One challenge that was anticipated in the separation of remdesivir and its active metabolites was the retention and peak shape of the nucleoside triphosphate (FIG. 4M). While separations have been achieved using ion pairing reagents and HILIC mode chromatography, the present technology focuses on the use of mixed-mode chromatography with ammonium acetate buffers to achieve a simple, fast analysis that can be used with either optical or MS detectors.

Mixed-mode chromatography achieves analyte separation by utilizing multiple types of interactions between the stationary-phase and the analytes. Mobile phase pH, ionic strength and organic content are all factors that can influence the retention and selectivity of analytes. Waters Corporation, Milford, MA, USA sells a column with a mixed mode stationary phase that is a reversed-phase/anion-exchange stationary phase based on bridged-ethyl hybrid particles (ATLANTIS™ BEH C18 AX stationary phase column). The utilization of bridged-ethyl particles allows for the use of a wide range of mobile phase pH values and the presence of both C18 and anion-exchange groups provides the ability to separate analytes based on either their hydrophobic or ionic characteristics. Additionally, ATLANTIS™ BEH C18 AX stationary-phase is the first chromatographic material that has been packed using LBS technology, designed to reduce acidic analyte interactions by incorporating the alkylsilyl coating on one or more internal stainless steel surfaces.

The methods of the present invention are useful for studying and quantifying other phospho prodrugs, not just polymerase inhibitors. FIGS. 4A-4E show the metabolites formed in vivo from adenine (FIG. 4A) or adenosine (FIG. 4B). The three phosphorylated metabolites include adenosine monophosphate (AMP) (see FIG. 4C), adenosine diphosphate (ADP) (see FIG. 4D), and adenosine triphosphate (ATP) (see FIG. 4E). ADP and ATP provide energy for metabolic processes and prodrugs aimed at helping to increase energy and metabolic processes for compromised (e.g., cancer) patients are in development.

Figure 5B:
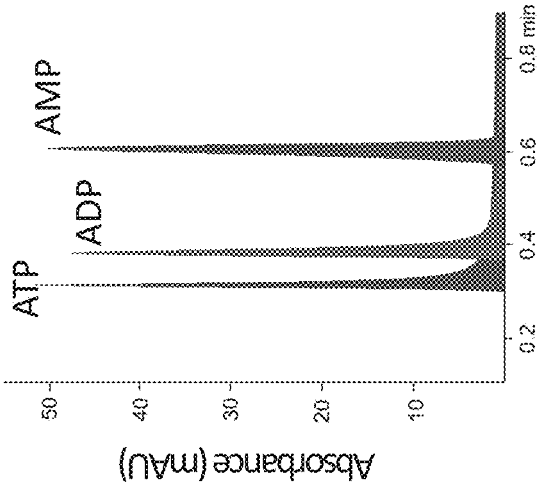
FIGS. 5A and 5B provide a comparison of separation results between three metabolites of adenosine (AMP, ADP, ATP) as separated using standard uncoated technology versus coating technology of the present disclosure. Ten sequential injections of the mixture (100 ng of each analyte) were introduced to each column.
Figure 5A:
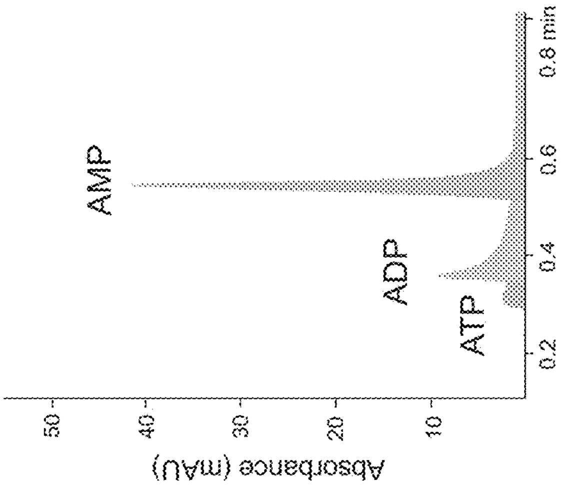

Separations of adenosine triphosphate ATP were investigated to demonstrate the utility of vapor deposition coated flowpaths to the enhance the LC based analysis of polymerase inhibitors, nucleotides, and nucleotide analogs. Applied to LC columns, the vapor deposition coatings of this invention offer improvements in the separation and detection of metal-sensitive analytes. These improvements can be observed in the form of a reduced requirement for passivation/conditioning, greater recovery, improved peak symmetry, extended linearity of MS calibration curves, and higher quality mass spectra. These benefits are illustrated in FIGS. 5A and 5B, wherein chromatographic data are reported that were obtained from a series of injections (i.e., 10 injections) of adenosine triphosphate (ATP), adenosine diphosphate (ADP) and adenosine monophosphate (AMP) on two columns. BEH C18 columns using standard stainless steel versus vapor deposition coated surfaces (i.e., C2 coated surfaces) were compared. Ten sequential injections of the mixture (100 ng of each of ATP, ADP, and AMP) were injected into the 2.1×50 mm columns, with a 10 mM ammonium acetate (pH 6.8) mobile phase at a 30° C. column temperature and a 0.5 mL/min flow rate. The results for the uncoated standard stainless steel column are presented in FIG. 5A and the coated column results appear in FIG. 5B. Sizeable differences in recovery were observed. Notably, the vapor deposition coated column (result from 5th injection shown in FIG. 5B) was found to produce an accurate profile of the sample even upon its first injection. This shows that the nature of this issue lies in the standard metallic column hardware and not the BEH stationary phase.

The coated columns used to generate the comparison data, were vapor deposited with a C2 coating and are commercially available as PREMIER column with MAXPEAK™ HPS, BEH C18 columns (Waters Corporation, Milford, MA). Conditions used for the chromatography and mass spectrometry are provided in Table 1 below:

Table 1: Reversed Phase LC-MS with QqQ Mass Spectrometric Detection of ATP and Adenosine

TABLE 1

| Reversed Phase LC-MS with QqQ Mass Spectrometric Detection of ATP and Adenosine | |
|---|---|
| **Test Conditions** | |
| Column | BEH C18 1.7 μm 2.1 × 50 mm |
| Sample | 400 pg/μL ATP (Adenosine 5'-triphosphate) disodium salt and 195 pg/μL adenosine in water |
| **Solvent Manager** | |
| Solvent Line A | 10 mM ammonium acetate, pH 6.8 in 99.8:0.2 water/Acetonitrile |
| Solvent Line B | Acetonitrile |
| Wash Solvent | 50:50 Water:Acetonitrile |
| Purge Solvent | 50:50 Water:Acetonitrile |
| Seal Wash Solvent | 50:50 Water:Acetonitrile |
| Diluent | Water |
| Flow Rate | 0.6 mL/min |
| Sample Temperature | 20° C. |
| Column Temperature | 40° C., APH Enabled |
| **ACQUITY PREMIER FTN** | |
| Column Heater Set Temperature | 40° C. |
| Pre-Inject | 0 sec |
| Post-Inject | 6 sec |
| Needle Placement (from bottom) | 3 mm * make sure that the needle's Z-axis position is properly calibrated. |
| **Xevo TQ-XS Mass Spectrometer with a tool-free ESI probe** | |
| Ion Mode | Negative Electrospray (ES−) |
| Capillary Voltage | −0.5 kV* |
| Desolvation Temperature | 600° C. |
| Desolvation Gas Flow | 1000 L/Hr |
| Cone Gas Flow | 150 L/Hr |
| Nebulizer Gas Pressure | 7.0 Bar |

TABLE 1-continued

Reversed Phase LC-MS with QqQ Mass Spectrometric Detection of ATP and Adenosine

Analyte SRM Conditions

| | MW | Transition | Cone Voltage (V) | Collision Energy (eV) | Dwell Time (sec) |
|---|---|---|---|---|---|
| Adenosine | 267.24 | 266.02 > 134.00 | 32 | 18 | 0.022 |
| ATP | 507.18 | 505.96 > 158.84 | 30 | 30 | 0.022 |

Figure 6A:
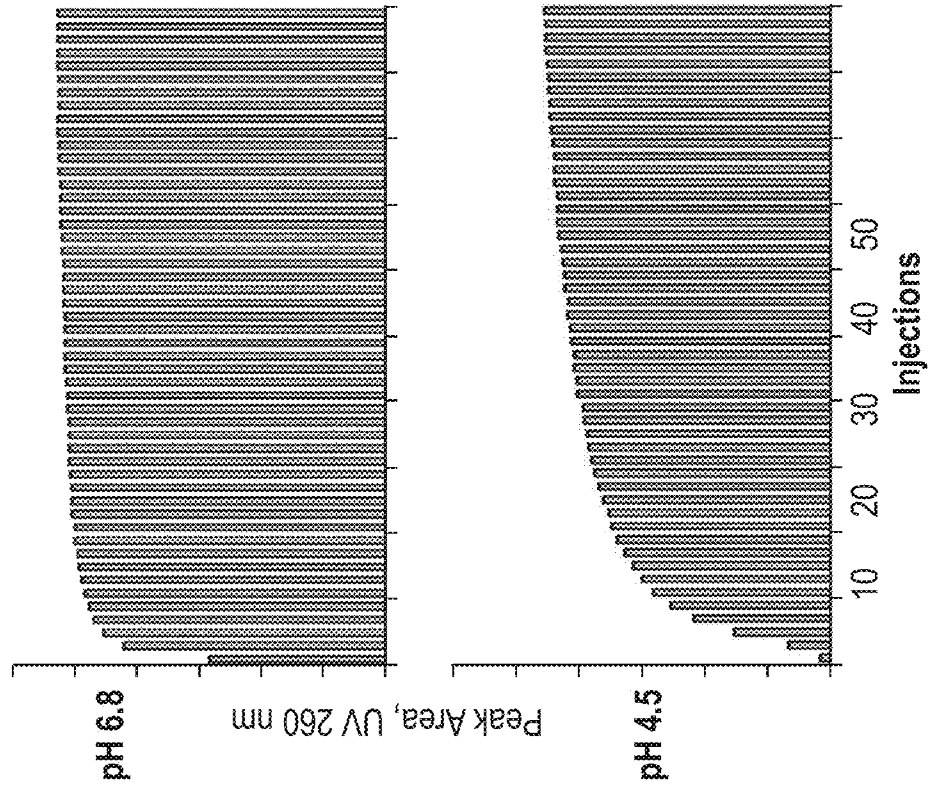
FIG. 6A graphs ATP recovery results from a standard uncoated chromatographic system as a function of mobile phase pH and number of repeat injections.
Figure 6B:
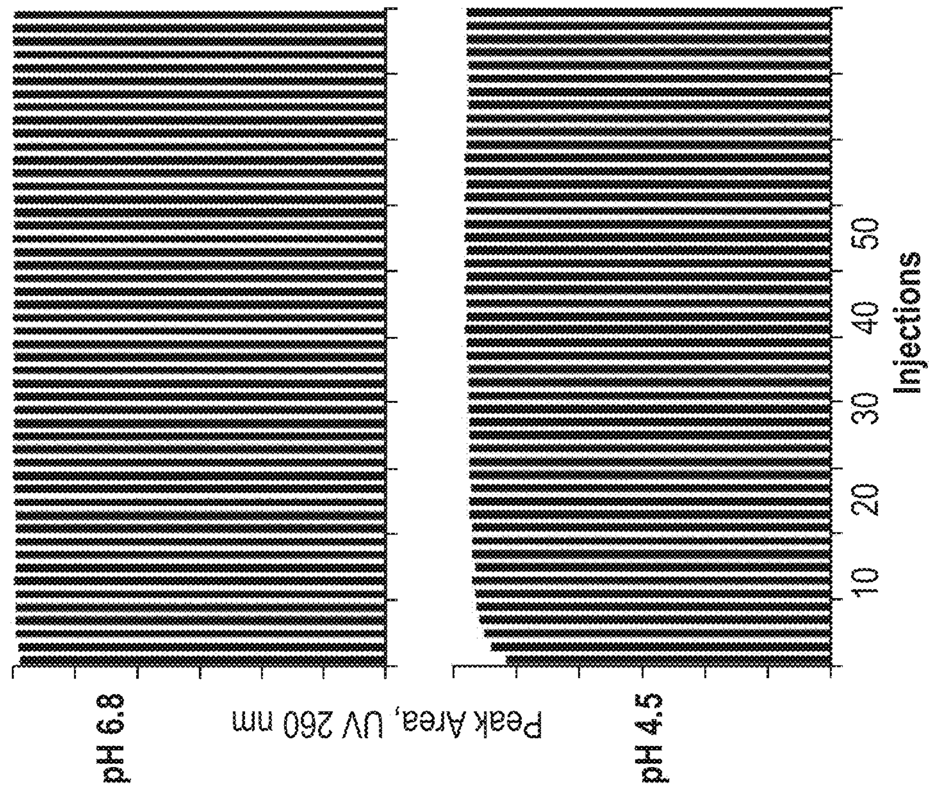
FIG. 6B graphs ATP recovery results from a C2 coated chromatographic system in accordance with the present technology as a function of mobile phase pH and number of repeat injections.

FIGS. 6A and 6B show the results of additional experiments where 50 sequential injections (100 ng) of ATP and AMP were performed with an isocratic separation using a 10 mM aqueous ammonium acetate mobile phase and a temperature of 30° C. For this experiment, a previously unused standard hardware ACQUITY® UPLC® BEH 130 Å $C_{18}$ 2.1×50 mm column (standard, uncoated chromatography system and column, available from Waters Corporation, Milford, MA) was first tested. Low peak areas are noticeable at pH 4.5; the first injections on the unused, standard column showed nearly complete ATP loss (FIG. 6A). In the subsequent injections, peak area gradually increased, suggesting that the metallic column hardware could be partially, yet not fully, passivated. Peak areas never reached a point corresponding to full recovery even after 50 injections. FIG. 6A also shows results from experiments with pH 6.8 mobile phase conditions. It can be seen that ATP loss decreased with an increase in pH. However, pronounced losses were still observed at pH 6.8. There is little evidence of any of this undesired behavior with a column constructed with vapor deposition coated hardware (FIG. 6B). The coated column was a previously unused C2-coated BEH 130 Å $C_{18}$ 2.1×50 mm column available from Waters Corporation, Milford, MA.

To achieve optimal performance for metal-sensitive analytes, all major sources of exposure to metal surfaces and dissolved metal ions must be considered. LC hardware upstream of the column should be addressed with extra care. Many LC instruments are constructed from stainless steel components, which are susceptible to corrosion-either with macroscopic visibility or with microscopic leachates and the formation of soluble metal ions. It is best for upstream LC hardware to therefore be constructed from corrosion resistant components. Alternatively, strong acid flushing (e.g. 30% phosphoric acid) can be incorporated into the routine maintenance of a stainless steel system to solubilize surface iron and produce a passivated layer. However, this type of procedure is harsh on instrumentation, and the passivation can be short-lived. To establish an LC assay for a metal sensitive analyte, it is thus ideal to use a corrosion resistant LC system.

Figures 7A, 7B, 7C:
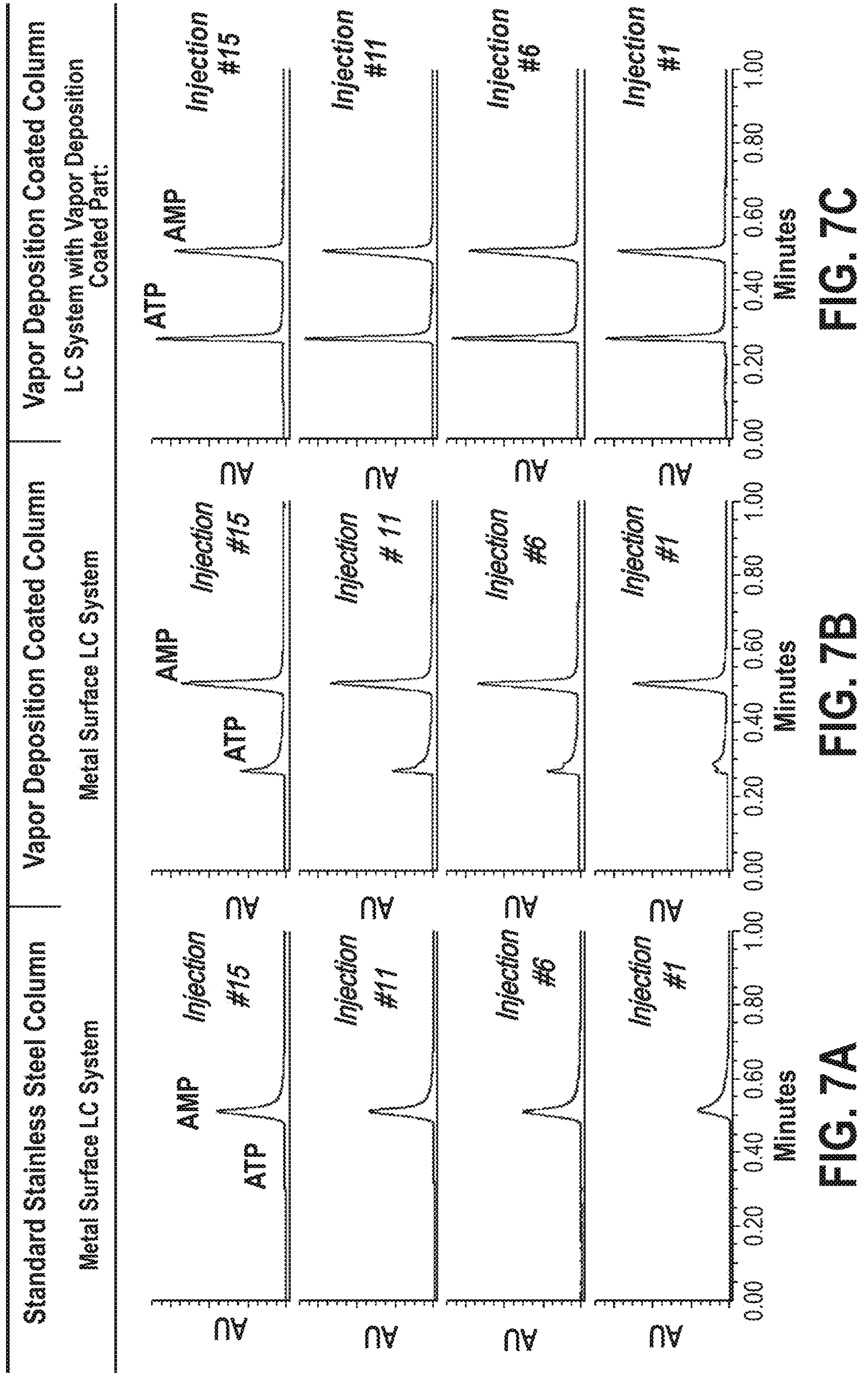
FIGS. 7A-7C provide chromatograms illustrating the chromatographic performance for metal sensitive analytes (ATP and AMP) on three different systems.

Moreover, one must consider potential sites where a sample might adsorb within the LC. The use of vapor deposition coated surfaces should thus also be extended from column hardware to the components of the LC instrument (e.g., upstream of the column, downstream of the column). The benefit of using an LC system with vapor deposition coated parts is demonstrated in FIGS. 7A-7C. Herein, ATP and AMP mixtures were repeatedly separated at 20 ng individual mass loads using a 10 mM ammonium acetate pH 6.8 mobile phase, 30° C. column temperature and a 0.5 mL/min flow rate. Chromatograms resulting from the first, sixth, eleventh, and fifteenth runs using an LC system with metal surfaces and a standard column (uncoated stainless steel 2.1×50 mm having BEH 130 Å $C_{18}$ chemistry) are shown in FIG. 7A. No peak could be observed for ATP, and the peak shape of AMP was found to change across the injections and to still show significant tailing for the fifteenth injection. Upon switching to a vapor deposition coated column (results shown in FIG. 7B), a peak could be obtained for ATP, though it is seen to be incompletely recovered and negatively influenced by severe amounts of peak tailing. The column used was a C2 coated stainless steel 2.1×50 mm having BEH 130 Å $C_{18}$ chemistry. It was not until vapor deposition coated parts were used for both the column and the LC system that near symmetrical peak shape was achieved and that recoveries of >95% were obtained. The results for a vapor deposition coated (C2 coated) column and LC system are shown in FIG. 7C.

In some embodiments, mobile phase purity must also be considered. While making up the mobile phase, it is advised to purchase LC-MS quality reagents that are certified by ICP testing to contain no more than ppb levels of metals. Mobile phase containers should also be chosen to avoid metal ion contamination, and metal sinker filters should not be used. In some instances, a low concentration (sub-millimolar) of chelating additive, such as citric acid, can be added to the mobile phase to mitigate any residual adsorption. Finally, depending on sample preparation protocols, some samples might contain free metal ions. Accordingly, it is foreseeable that some assays may benefit from adding chelators and/or suitable internal standards to samples. In which case, residual adsorptive sites will be transiently passivated with each sample injection. Similarly, it might even be advantageous in some instances to include a chelating additive in a sample preparation process, especially where complicated adsorption and Lewis acid-base interactions might be at play. With these considerations and the use of vapor deposition coated LC surfaces, it will become possible to reliably perform LC analyses for even the most challenging metal sensitive analytes.

In some embodiments, the mobile phase is carefully considered to minimize degradation of pyrophosphate bonds. Accordingly, solutions with relatively neutral pH values are preferred. A pH ranging from 2 to 11 can be employed, but pH values ranging from 3 to 8 are preferred, in particular, 6 to 7. In a preferred embodiment the mobile phase is comprised of volatile components to be compatible with mass spectrometric detection. Acetic acid, formic acid, ammonium hydroxide, triethyl amine, ammonium acetate, and ammonium formate are preferentially used. Chromatographic separations can be achieved by isocratic or gradient elution using reversed phase, HILIC, mixed mode or ion exchange separations. Water can be used a primary component of a mobile phase along with one or more organic modifiers, including but not limited to acetonitrile, methanol, ethanol, isopropanol, n-propanol, and THF.

Figures 8A, 8B:
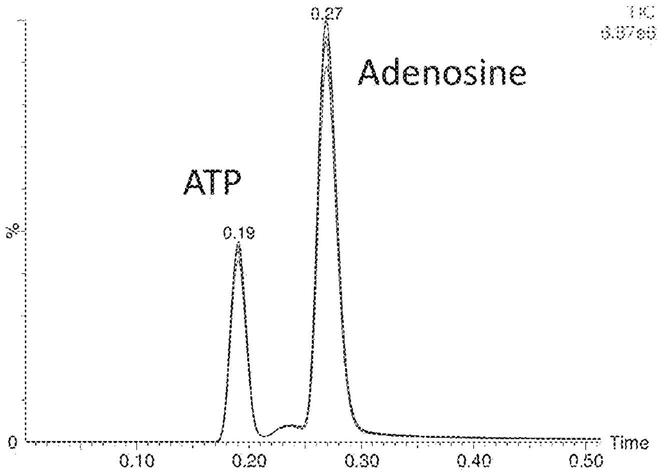
FIGS. 8A and 8B provide LC-MS results of ATP and the prodrug adenosine using vapor deposition coated LC surfaces (C2 coated surfaces) and SRMs with a QqQ mass spectrometer. Repeat injections of 1 μL injections of 400 pg ATP and 195 pg adenosine were used.

In practice, vapor deposition coated LC surfaces are advantageously used to perform the bioanalysis of a dosed polymerase inhibitor and its active metabolites by increasing analyte recovery, improving dynamic range, and reducing the undesired production of metal adducted ions. FIGS. 8A and 8B demonstrate an exemplary embodiment of a reversed phase separation of adenosine and its triphosphate form. In this example, repeat injections of 1 μL injections of 400 pg of ATP and 195 pg of adenosine were used. The results of this example are provided in a chromatograph in FIG. 8A and in table form in FIG. 8B. Detection is afforded by a triple quadrupole mass spectrometer and the application of single reaction monitoring. In some embodiments, multiple reaction monitoring can be employed. To prepare a sample for analysis, a patient sample (mammalian plasma, or synthetic plasma) can be directly analyzed or subjected to protein precipitation or liquid extraction. In some embodiments, the blood sample can be processed through a phospholipid or phospholipid and protein capture plate.

Figure 9A:
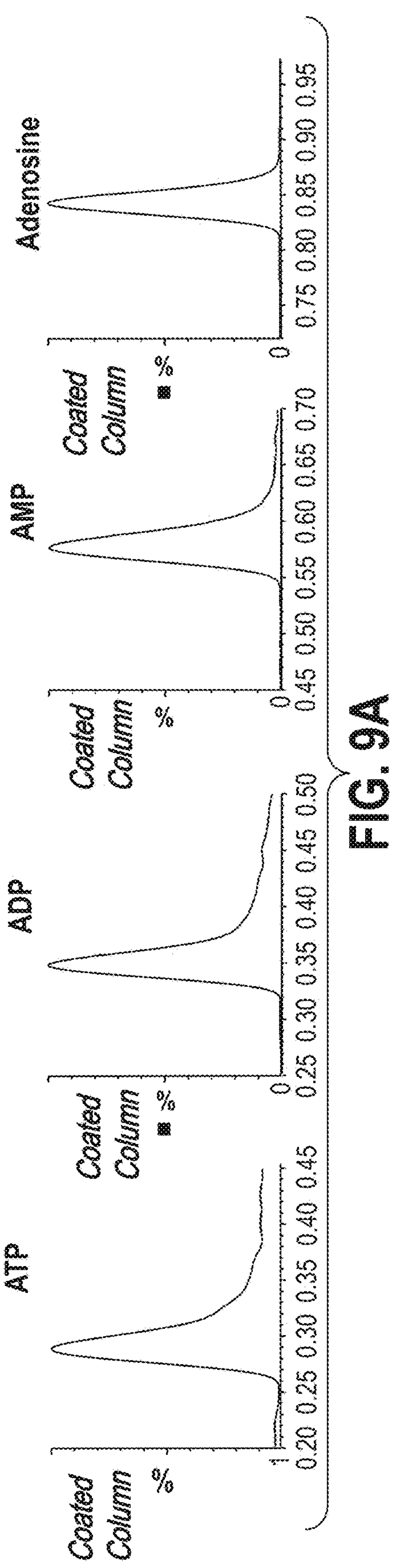
FIG. 9 provides chromatograms of each of ATP, ADP, AMP, and adenosine at 50 pg/uL×1.0 μL injections, using coated columns (top row, labeled A) versus uncoated stainless steel columns (bottom row, labeled B).
Figure 9B:
Figure 10A:
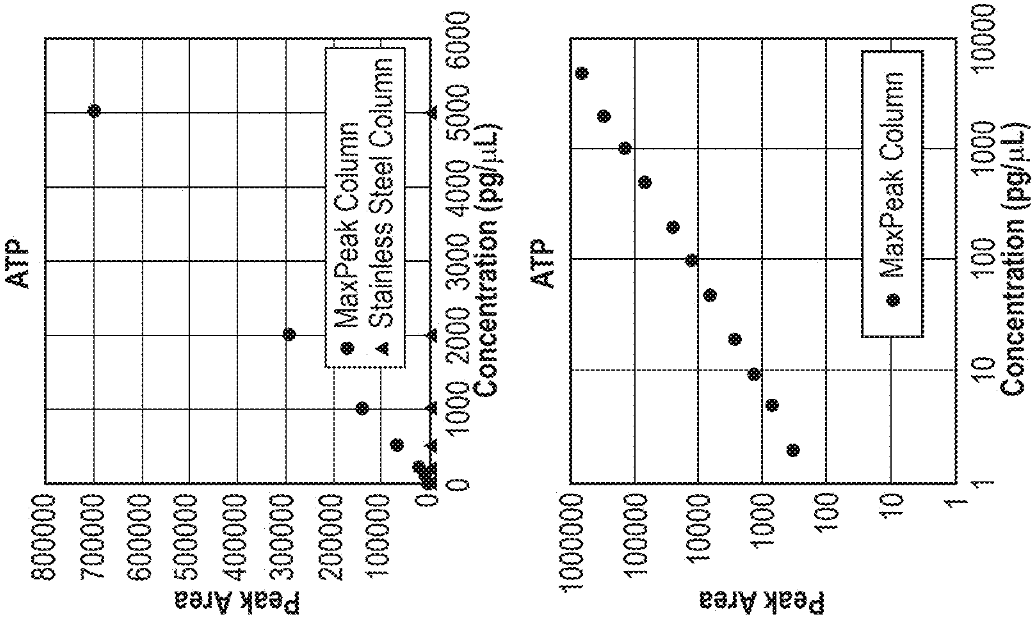
FIGS. 10A-10D provide calibration curves for ATP, ADP, AMP and adenosine obtained using coated versus stainless steel (uncoated) column technology. The top row presents the data on a linear scale, whereas the bottom row presents the data on a log scale.
Figure 10B:
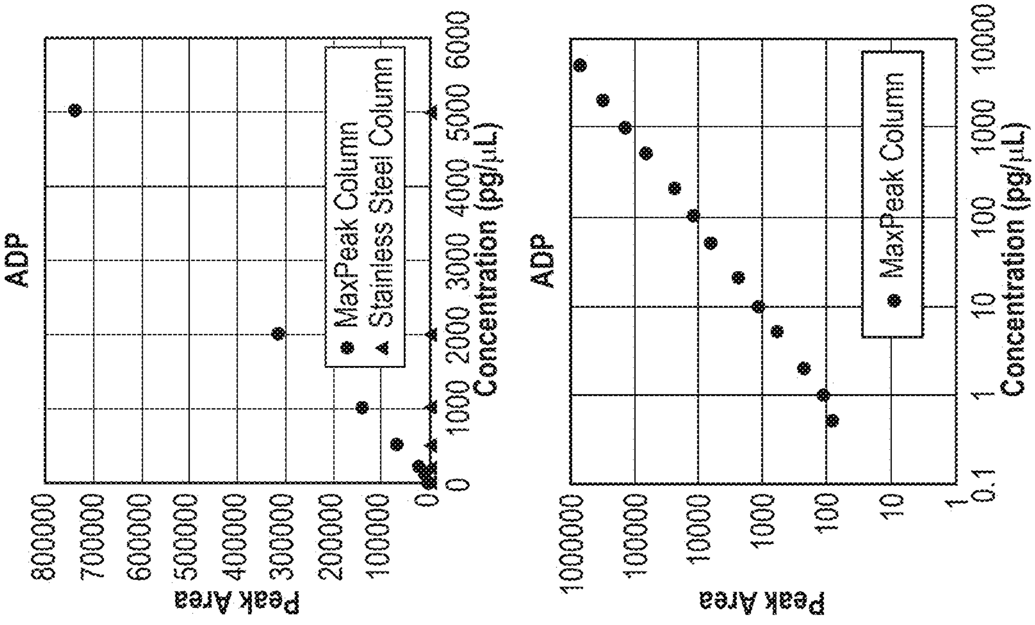
Figure 10C:
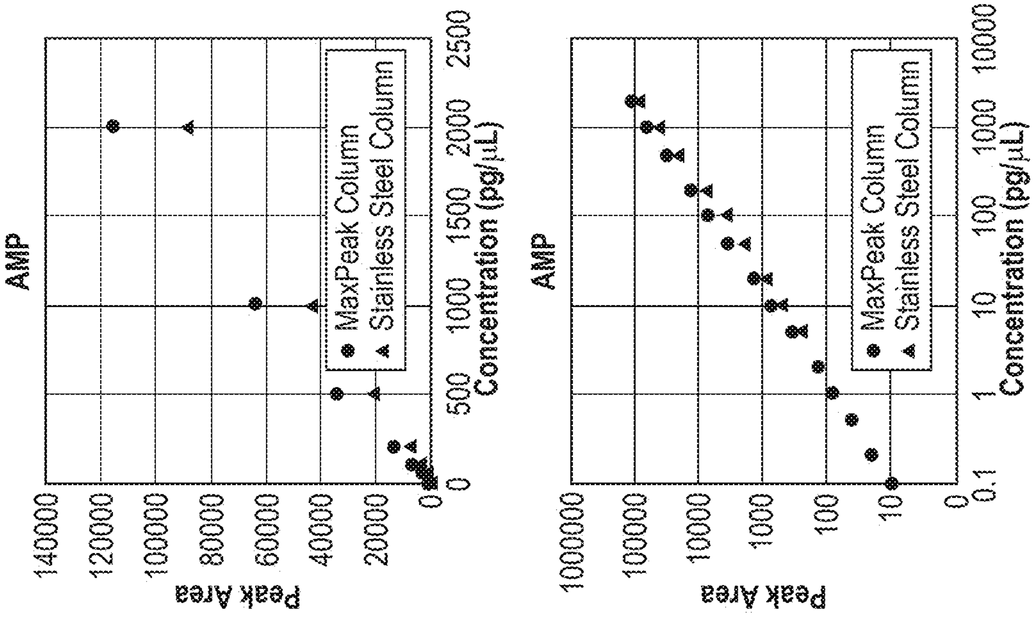
Figure 10D:
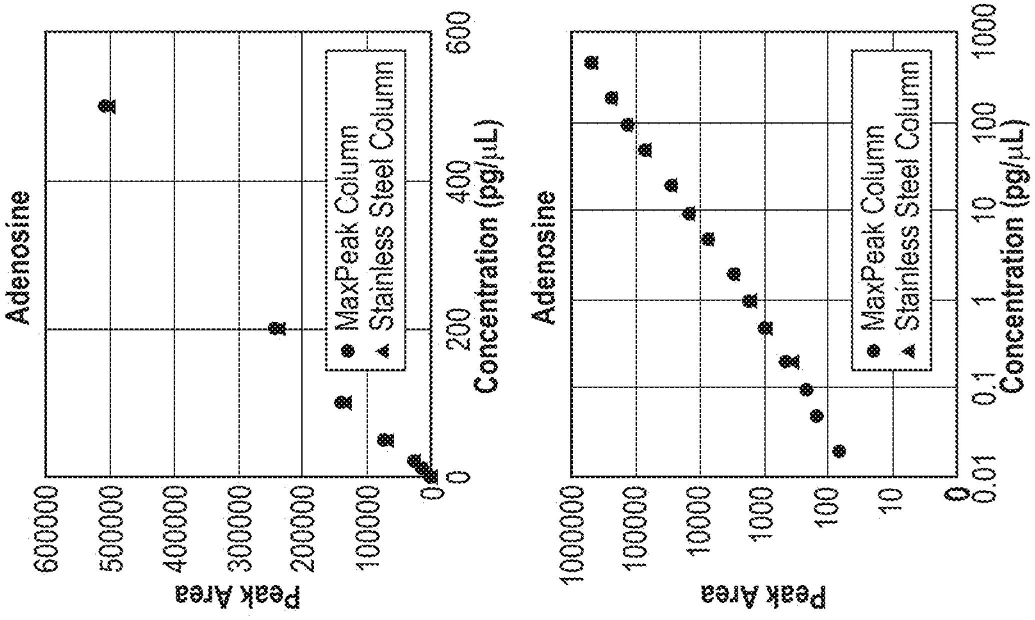

In a further study of adenosine and its phosphate containing biological metabolites, the effects of analyte loss in standard, uncoated column technology was investigated for each analyte. FIG. 9 shows example chromatograms—one for each of—adenosine and its phosphorylated metabolites AMP, ADP, and ATP. The chromatograms are presented from left to right for analytes having the greatest metal-sensitivity to the least. That is, the left most chromatogram is for ATP (adenosine triphosphate), the second from the left is ADP (adenosine diphosphate), the third from the left is AMP (adenosine monophosphate) and the rightmost chromatogram is adenosine. The top row chromatograms (labeled A) are the results from the separation and MS detection from a C2 coated column; the bottom row chromatograms (labeled B) are the results from the separation and MS detection from a stainless steel uncoated column. Adenosine (shown as the rightmost chromatogram in both row A and B), which is not a metal-sensitive analyte as it does not include a phosphate group, showed a little to no difference in peak area when using the stainless steel column (row B) as compared to the coated column of the present technology. AMP, which contains a metal-sensitive single phosphate group, showed a little loss in peak area when the stainless steel (uncoated) column was utilized. For ADP and ATP, which contain more metal-sensitive phosphate groups, the peaks are well defined when the C2 coated columns were used for analysis. These same peaks are completely missing from the results obtained on the stainless steel columns.

In addition to investigating the loss of analyte (thus loss of reliable quantitation), dynamic range for adenosine, AMP, ADP, and ATP was also compared between stainless steel (uncoated) columns and the coated columns of the present technology. FIGS. 10A-10D provides the calibration curves in both linear (above) and log (below) scale for ATP, ADP, AMP, and adenosine for each of the C2 coated column (MAXPEAK™ Column, circles) and the stainless steel column (triangles). As the results from the stainless steel column did not show ATP and ADP, the two most metal-sensitive compounds, the log scale for both ATP and ADP are limited to the results from the coated column. As expected, the calibration curves for adenosine were similar in their slopes and dynamic range regardless of column type. The slope of the AMP calibration curve using the stainless steel column was smaller than the slope using the C2 coated column. The smaller slope results in a lower assay sensitivity using the stainless steel column. The AMP calibration curve acquired using the C2 coated column was linear from 100 fg/μL to 2 ng/μL (>4 orders of magnitude), while the curve acquired using a stainless steel column (uncoated) was linear only from 5 pg/μL to 2 ng/μL (<3 orders of magnitude). The ATP and ADP calibrations curves constructed using the C2 coated column show a dynamic range of greater than 3 orders of magnitude (2 pg/μL-5 ng/μL for ATP and 500 fg/μL-5 ng/μL for ADP). The entire calibration range for each of ATP, ADP, AMP, and Adenosine is provide in the following chart:

TABLE 2

| Calibration Range For ATP, ADP, AMP, and Adenosine shown in FIGS. 10A-10D: | | | | |
|---|---|---|---|---|
| | Range (ATP) | Range (ADP) | Range (AMP) | Range (Adenosine) |
| C2 Coated Column | 2 pg/μL-5 ng/μL (r = 0.996) | 500 fg/μL-5 nL/μL (r = 0.9986) | 100 fg/μL-2 ng/μL (r = 0.9972) | 20 fg/μL-0.5 ng/μL (r = 0.9895) |
| Stainless Steel Column | No peak | No peak | 5 pg/μL-2 ng/μL (r = 0.9977) | 200 fg/μL-0.5 ng/μL (0.9908) |

To obtain the results shown in FIGS. 9 and 10, the following experimental conditions were utilized. An ultra performance HPLC system (ACQUITY® UPLC® I-Class System, Waters Corporation, Milford MA) was provided with a MS detector (Xevo TQ-XS also from Waters Corporation, Milford, MA). The ACQUITY® system included the I-class binary solvent manager and I-class sample manager with a flow through needle. The mass detector included an ESI source and tool-free ESI probe. The columns used were a stainless steel ACQUITY® HSS T3, 1.8 μm, 2.1×50 mm (Waters Corporation) and a coated column ACQUITY® PREMIER HSS T3, 1.8 μm, 2.1×50 mm (Waters Corporation). Column temperature was set and maintained at 35° C. The mobile phases included two components. Mobile Phase A: 10 mM ammonium acetate, pH 6.8 (0.2% acetonitrile) and Mobile Phase B: acetonitrile. The mobile phase components were run according to the following gradient conditions.

TABLE 3

| Experimental Conditions: | | | | |
|---|---|---|---|---|
| Time | Flow Rate | % A | % B | Curve |
| Initial | 0.5 mL/min | 99.5 | 0.5 | — |
| 0.1 | 0.5 mL/min | 99.5 | 0.5 | 6 |
| 0.2 | 0.5 mL/min | 92.0 | 8.0 | 6 |
| 0.7 | 0.5 mL/min | 92.0 | 8.0 | 6 |
| 0.8 | 0.5 mL/min | 70.0 | 30.0 | 6 |
| 0.9 | 0.5 mL/min | 70.0 | 30.0 | 6 |
| 1.0 | 0.5 mL/min | 99.5 | 0.5 | 6 |
| 2.0 | 0.5 mL/min | 99.5 | 0.5 | 11 |

MS conditions were as follows:

Ion Mode: Negative Electrospray (ES-)

Capillary Voltage: about-0.5 kV (fined tuned to maximize the signal)

Desolvation Temperature: 600° C.

Desolvation Gas Flow: 1000 L/Hr

Cone Gas Flow: 150 L/Hr

Nebulizer Gas Pressure: 7.0 Bar

For the analysis, analyte SRM conditions were as shown in Table 4.

| | MW | Transition | Cone Voltage (V) | Collision Energy (eV) |
|---|---|---|---|---|
| ATP | 507.18 | 505.96 > 158.84 | 30 | 30 |
| ADP | 427.20 | 425.98 > 134.00 | 48 | 22 |
| AMP | 347.22 | 346.00 > 134.00 | 50 | 30 |
| Adenosine | 267.24 | 266.02 > 134.00 | 32 | 18 |

Pharmacokinetic Evaluation Example

Three uninfected male rhesus monkeys (Macaca mulatta) were used for the pharmacokinetic study. Remdesivir was formulated in solution at a pH 4-6.0, and 2 ml $kg^{-1}$ was administered by slow bolus (approximately 1 min) for a final dose of 10 mg $kg^{-1}$. Blood samples for plasma were collected from a femoral vein/artery and were taken from each monkey over a 24-h period. Plasma samples were obtained at predose and at 0.083, 0.25, 0.5, 1, 2, 4, 8, and 24 h postdose. Blood samples for plasma were collected into chilled collection tubes containing sodium fluoride/potassium oxalate as the anticoagulant and were immediately placed on wet ice, followed by centrifugation to obtain plasma. Plasma samples were frozen immediately and stored at ≤60° C. until analyzed.

For plasma analysis, an aliquot of 25 μl of each plasma sample was treated with 100 μl of 90% methanol and acetonitrile mixture (1:1, v:v) and 10% water with 20 nM 5-(2-aminopropyl) indole as an internal standard. Then, 100 μl of samples were filtered through an 96 well 0.2 μm C2 coated filter plate (sold under the same QUANRECOVERY™ Plate with MAXPEAK™ High Performance Surfaces, available from Waters Corporation, Milford, MA). Filtered samples were dried down completely for approximately 20 min and reconstituted with 1% acetonitrile and 99% water with 0.01% formic acid. An aliquot of 10 μl was injected for LC-MS/MS using a HTC Pal autosampler. Analytes were separated on a C2 coated column ATLANTIS™ PREMIER BEH $C_{18}$ AX column (50×2.1 mm, 1.7 μm) using a Waters ACQUITY® UPLC® (Waters Corporation, Milford, MA, USA), a flow rate of 0.26 ml min-1, and a gradient from Mobile phase A containing 0.2% formic acid in 99% water and 1% acetonitrile to mobile phase B containing 0.2% formic acid in 95% acetonitrile and 5% water over 4.5 min. For MS/MS analysis, we used a Waters Xevo TQ-S in positive multiple reaction monitoring mode using an electrospray probe. Plasma concentrations of remdesivir, and its metabolites remdesivir (nucleotide monophosphate), remdesivir (nucleotide diphosphate) and remdesivir (nucleotide triphosphate) were determined using an 8-point calibration curve spanning a concentration range of over three orders of magnitude. Quality control samples were run at the beginning and end of the run to ensure accuracy and precision within 20%.

Experimental Example of Separating and Analyzing Remdesivir

The following conditions were used to analyze remdesivir, its parent nucleoside, and the nucleoside triphosphate using a mixed-mode reversed-phase/anion exchange stationary phase based on bridged-ethyl hybrid particles; ATLANTIS™ PREMIER BEH C18 AX Column (commercially available from Waters Corporation, Milford, MA).

TABLE 4

| Test Conditions | |
|---|---|
| Column | Atlantis BEH C18 AX 1.7 μm, 2.1 × 50 mm (Waters Corporation) C2 coated stainless steel column |

TABLE 4-continued

| Test Conditions | |
|---|---|
| LC System | Acquity Premier Quaternary System (Waters Corporation) Solvent Manager |
| Mobile Phase A | 100% Acetonitrile |
| Mobile Phase B | IonHance CX-MS Concentrate A pH 5 (1:5 Dilution) p/n 186009280 |
| Mobile Phase C | 100% 18 MΩ water |
| Mobile Phase D | IonHance Ammonium Acetate pH 6.8 Concentrate (1:5 Dilution) p/n 186009705 |
| Injection Volume | 1 μL |
| Flow Rate | 0.5 mL/min |
| Sample Temperature | 12° C. |
| Column Temperature | 50° C |
| Detectors | |
| Detector 1 | Acquity Premier PDA Detector (Waters Corporation) |
| Detector 2 | Acquity QDa Mass Detector (Waters Corporation) |

Standards were purchased from multiple sources. Remdesivir was purchased from Ambeed (Arlington Heights, IL, USA), remdesivir nucleoside was purchased from Biosynth-Carbosynth (Itasca, IL, USA), and the remdesivir nuceloside triphosphate was purchased from AOBIOUS, Inc. (Gloucester, MA, USA).

Two standard samples containing both remdesivir and the remdesivir nucleoside triphosphate were prepared in the concentration ratios of 500:50 pg/mL (sample: S1) and 50:500 μg/mL (sample: S2). These ratios were prepared to mimic two different timepoints from dosing and start of metabolic conversion. A single component sample of remdesivir nucleoside (S3) was prepared at 10 μg/mL and 100 μg/mL concentrations.

Chromatographic mobile phases were prepared on-line using a quaternary pump with IonHance™ buffer concentrates (which contain 20% (v/v) acetonitrile). The buffer concentrates were prepared with 1:5 dilution to achieve final concentrations of 100 mM in 4% acetonitrile for the IonHance™ CX-MS Concentrate A, pH 5 and 200 mM in 4% acetonitrile for the IonHance™ Ammonium Acetate pH6.8 Concentrate. The 1:5 dilutions were mixed with 18 MΩ water and acetonitrile to form the gradient. The final gradient was 5 mM ammonium acetate 6.8 in 0% acetonitrile to 20 mM ammonium acetate pH6.8 in 60% acetonitrile in 4 minutes using a linear gradient (curve 6) and return to initial in 0.5 minutes. A longer 8-minute gradient was also run with good results.

Remdesivir has a moderate logP value of 2.01, so it was predicted that a relative high percentage of acetonitrile would be required to elute the prodrug. It was also predicted that pH would have a critical effect on the retention of the nucleoside triphosphate.

The retention factor for remdesivir was calculated for a series of injections made using isocratic elution conditions and mobile phases prepared with an acetonitrile content range of 40 to 60% in 10 mM ammonium acetate. Additionally, the effect of pH values 4.8 and 6.8 was evaluated.

To achieve retention factors that were greater than one but less than 10, remdesivir required that at least 40 to 60% acetonitrile be used, regardless of the pH of the aqueous mobile phase. A higher organic endpoint was used preferred for the potential application of the method to additional, more hydrophobic analytes. Like in the screening of conditions for remdesivir, two pH values were also used to analyze remdesivir nucleoside triphosphate. However, most of the analyses were conducted using the preferred pH of 6.8. The higher pH produced sharper peaks than the pH 4.8 mobile phase, albeit with slightly lower resolution between the diphosphate and triphosphate forms. If desired, mobile phase pH can thus be adjusted to fine tune the separation.

Figure 11A:
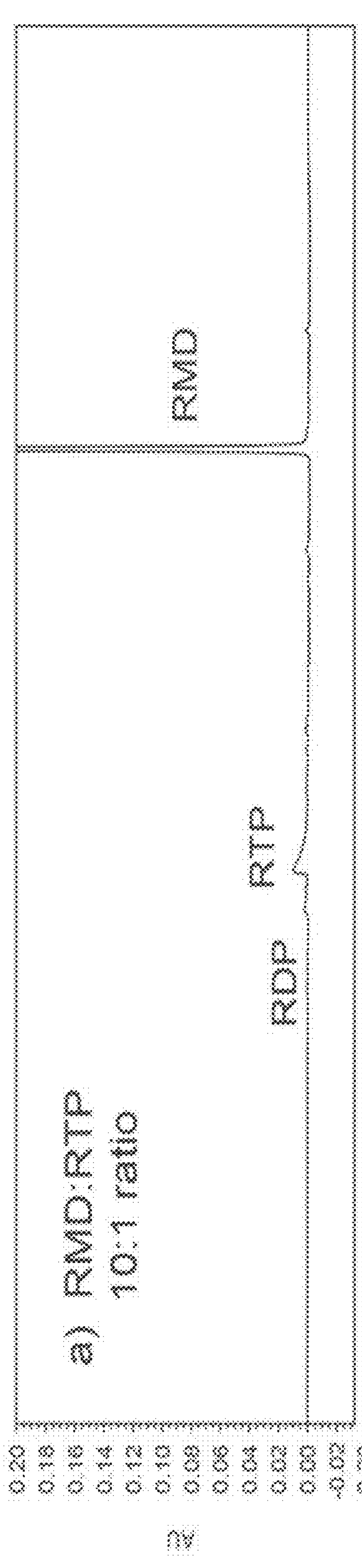
FIG. 11A is a LC-UV chromatograph comparing a 10:1 ratio of remdesivir (RMD) to remdesivir nucleoside triphosphate (RTP) using a 4 minute gradient. The presence of remdesivir nucleotide diphosphate is shown as (RDP).
Figure 11B:
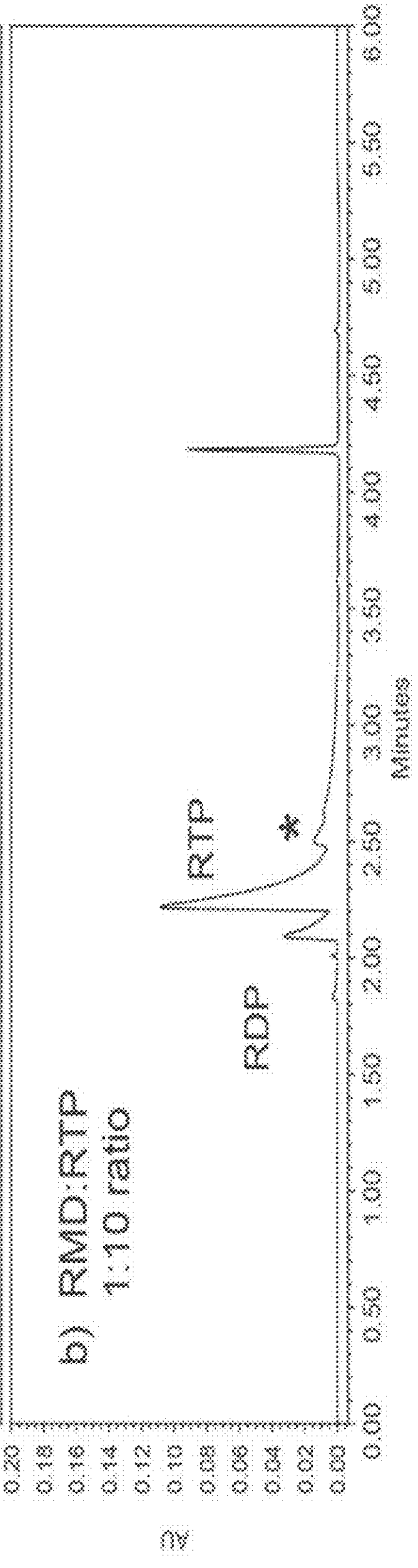
FIG. 11B is a LC-UV chromatograph comparing a 1:10 ratio of RMD to RTP. The asterisk (*) in FIG. 11B denotes an unknown presence in sample S2.

A comparison of the two standards is shown in FIG. 11A and FIG. 11B. The top chromatograph (FIG. 11A) was obtained from sample S1 (a sample comprised of remdesivir at 10 times the concentration of remdesivir nucleoside triphosphate); while the bottom chromatograph (FIG. 11B) was obtained from sample S2 (the opposite ratio, 1 part remdesivir to 10 parts remdesivir nucleoside triphosphate). The mass load-on-column for remdesivir was approximately 0.8 nmol for FIG. 11A and 0.08 nmol for FIG. 11B.

Figure 12A:
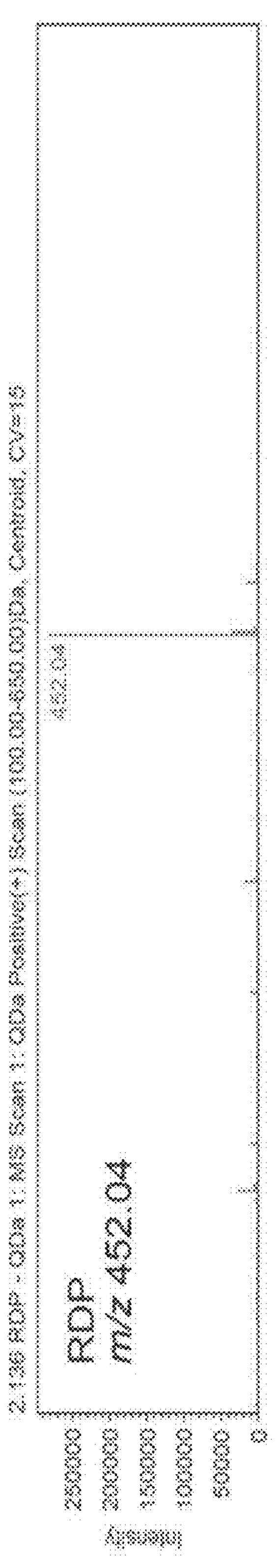
FIG. 12A illustrates the peak identification of RDP using an ACQUITY® QDa Mass Detector.
Figure 12B:
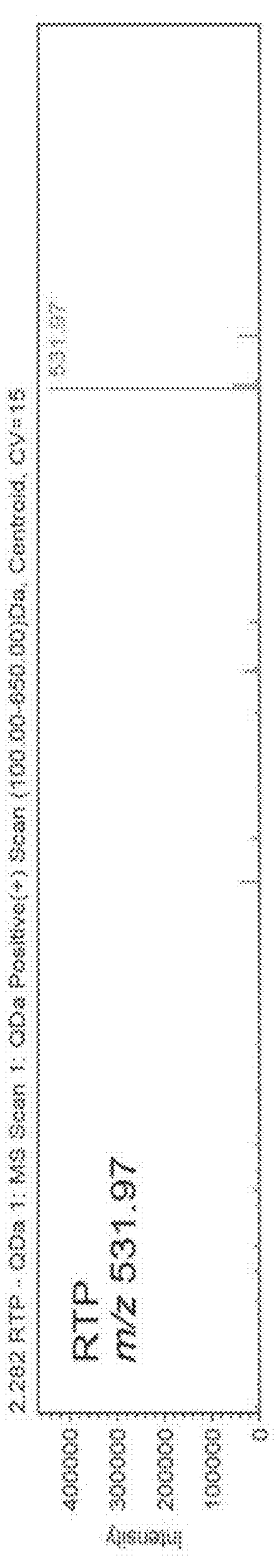
FIG. 12B illustrates the peak identification of RTP using an ACQUITY® QDa Mass Detector.
Figure 12C:
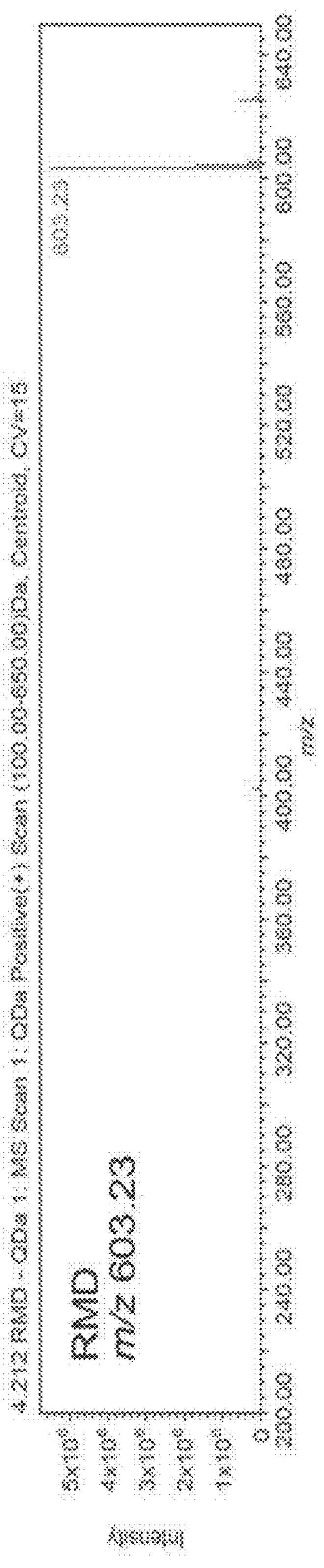
FIG. 12 C illustrates the peak identification of RMD using an ACQUITY® QDa Mass Detector.

Peak identification was confirmed using detector 2, ACQUITY® QDa Mass Detector and extracting the m/z values for each analyte, see FIGS. 12A, 12B, and 12C. At pH 6.8, the anion-exchange sites were tuned to elute remdesivir triphosphate within the gradient, while the C18 groups played a greater role in the retention of remdesivir. The primary goal of good retention for remdesivir triphosphate and resolution from remdesivir was achieved using these conditions. Additional method optimization could be undertaken to improve peak symmetry for remdesivir triphosphate, such as reducing mass injected on column.

Figure 13:
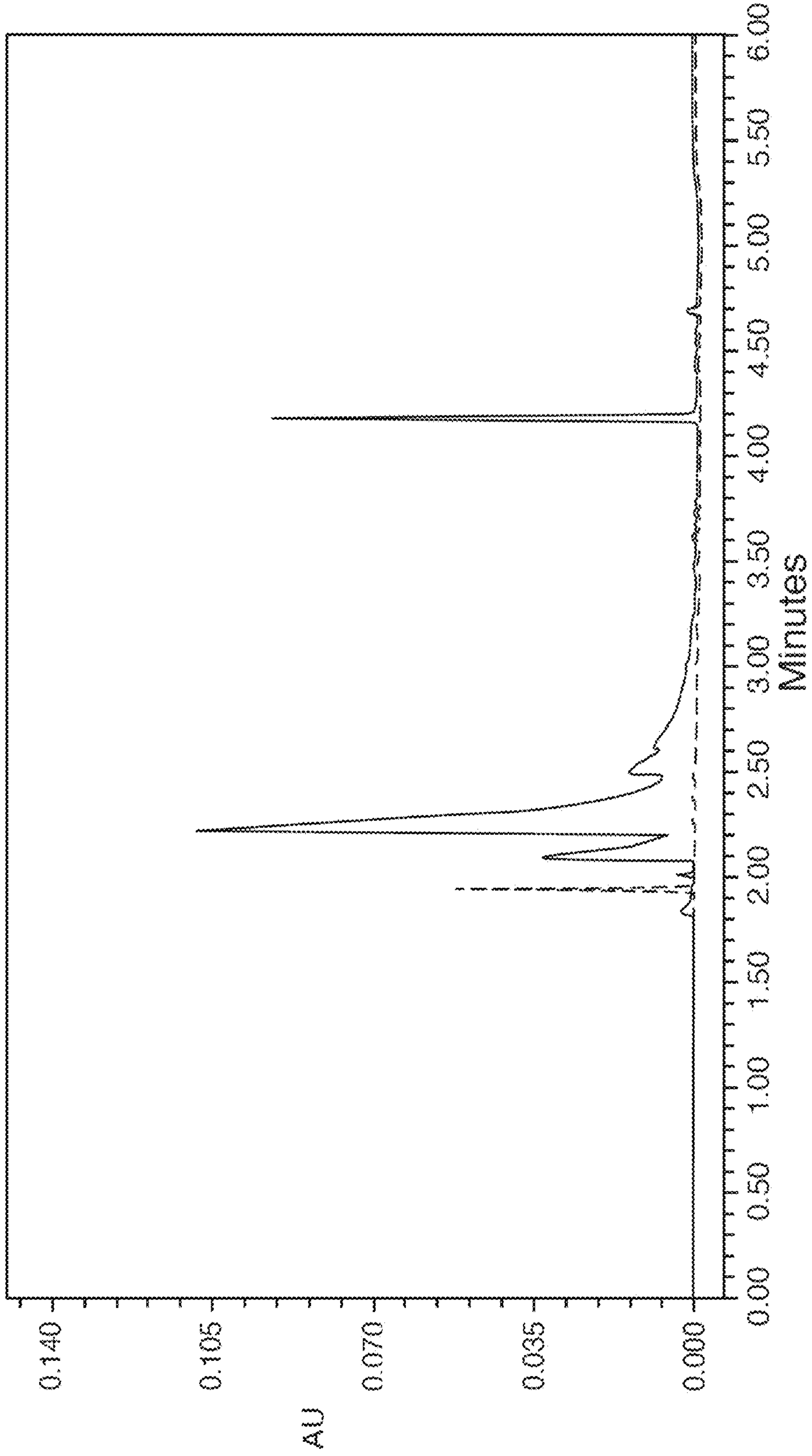
FIG. 13 provides an overlay of remdesivir nucleoside (dashed trace) with RMD and RTP 1:10 concentration ratio (solid trace) using the 4 minute gradient.

The final gradient was also used to analyze the remdesivir nucleoside (sample S3) together with the 1:10 ratio of remdesivir to remdesivir triphosphate (sample S2), see FIG. 13. As the remdesivir nucleoside (S3) analyte elutes earlier in the gradient (see dashed trace line which elutes prior to 2.00 minutes) and does not interfere with the nucleoside triphosphate (see solid trace line of S2 which elutes after the 2.00 minute mark), it may provide a new starting point for additional gradient optimization.

Ammonium acetate mobile phases prepared in these examples did not include the use of ion pairing reagents. As a result, the mobile phase solutions (with the ammonium acetate) provide the option of using optical as well as MS detection. Fast and easy mobile phase preparation was accomplished by using readily available, MS-certified buffer concentrates, While this disclosure has been particularly shown and described with reference to example embodiments thereof, it will be understood by those skilled in the art that various changes in form and details may be made therein without departing from the scope of the technology encompassed by the appended claims. For example, other chromatography systems or detection systems can be used.

What is claimed is:

1. A method of detecting remdesivir in a sample, the method comprising:

providing the sample to a chromatography column housing a mixed-mode stationary phase disposed therein, the chromatography column comprising a vapor deposited alkylsilyl coating covering at least a portion of wetted internal surfaces of the chromatography column;

separating and eluting remdesivir from the sample by applying a gradient of a mobile phase solution comprising ammonium acetate; and detecting remdesivir in the eluent using a mass spectrometry detector or an optical detector.

2. The method of claim 1, wherein the mobile phase solution does not include an ion pairing reagent.

3. The method of claim 1, wherein the mobile phase solution has a pH within the range of 4.8 to 7.

4. The method of claim 1, further comprising detecting one or more phosphorylated metabolites of remdesivir in the eluent using the mass spectrometry detector or the optical detector.

5. The method of claim 1, wherein the gradient is a linear gradient.

6. The method of claim 1, wherein the gradient is achieved by varying a concentration of ammonium acetate.

7. The method of claim 6, wherein the gradient is achieved by varying a concentration of acetonitrile.

8. The method of claim 7, wherein the concentration of acetonitrile ranges from 0 to 60 volume percent.

9. The method of claim 1, wherein the vapor deposited alkylsilyl coating comprises bis(trichlorosilyl)ethane or bis (trimethoxysilyl)ethane.

* * * * *